United States Patent
Culter et al.

(10) Patent No.: US 7,502,803 B2
(45) Date of Patent: Mar. 10, 2009

(54) SYSTEM AND METHOD FOR GENERATING ACPI MACHINE LANGUAGE TABLES

(75) Inventors: Bradley G. Culter, Dallas, TX (US); Marvin Spinhirne, Mesquite, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1266 days.

(21) Appl. No.: 10/446,950

(22) Filed: May 28, 2003

(65) Prior Publication Data

US 2004/0243534 A1 Dec. 2, 2004

(51) Int. Cl.
*G06F 17/30* (2006.01)
(52) U.S. Cl. ...................... 707/101; 707/100
(58) Field of Classification Search ............... 707/1–10
See application file for complete search history.

(56) References Cited

U.S. PATENT DOCUMENTS

| | | | |
|---|---|---|---|
| 5,903,894 A | 5/1999 | Reneris | |
| 6,055,643 A | 4/2000 | Chaiken | |
| 6,065,067 A | 5/2000 | Hobson et al. | |
| 6,081,901 A * | 6/2000 | Dewa et al. | 713/300 |
| 6,131,131 A | 10/2000 | Bassman et al. | |
| 6,167,511 A | 12/2000 | Lewis | |
| 6,167,512 A | 12/2000 | Tran | |
| 6,185,677 B1 | 2/2001 | Nijhawan | |
| 6,219,742 B1 | 4/2001 | Stanley | |
| 6,230,279 B1 * | 5/2001 | Dewa et al. | 713/324 |
| 6,360,289 B2 | 3/2002 | Porterfield | |
| 6,360,327 B1 | 3/2002 | Hobson | |
| 6,598,169 B1 * | 7/2003 | Warwick et al. | 713/320 |
| 6,970,957 B1 * | 11/2005 | Oshins et al. | 710/60 |
| 7,007,160 B1 * | 2/2006 | Makphaibulchoke et al. | 713/1 |
| 2002/0133487 A1 * | 9/2002 | Oshins et al. | 707/5 |
| 2003/0093607 A1 * | 5/2003 | Main et al. | 710/306 |

OTHER PUBLICATIONS

Compaq Computer Corporation, et al. "Advanced Configuration and Power Interface Specification," Rev. 2.0a, Mar. 31, 2002, p. 1-484. (Title page, publication page, and table of contents provided; complete document will be provided upon request.).

* cited by examiner

*Primary Examiner*—Khanh B Pham

(57) ABSTRACT

An ACPI-compatible system is provided that comprises a database for storing a device-specific descriptor for a hardware device. The system further comprises an ACPI agent operable to autonomously construct an ACPI table entry for the hardware device using the device-specific descriptor. Also, a method for an ACPI-compatible system autonomously constructing an ACPI table entry for a hardware device is provided. The method comprises receiving from firmware associated with the hardware device, a device-specific descriptor for such hardware device, and an ACPI agent executing on the ACPI-compatible system using the device-specific descriptor to autonomously construct an ACPI table entry for the hardware device.

20 Claims, 9 Drawing Sheets

SYSTEM AND METHOD FOR GENERATING ACPI MACHINE LANGUAGE TABLES

DESCRIPTION OF RELATED ART

An operating system (OS) is a component of a computer system. Many OSs are known in the existing art, such as DOS, WINDOWS 2000, WINDOWS NT, UNIX, LINUX, and many others. In general, an OS provides a common platform for software executing on the computer system. For example, without an OS, two different programs may not be able to save files that they each create to the same disk because each may have its own storage format. Additionally, an OS typically provides tools for performing tasks outside of an application program, such as deleting and copying files to disks, printing, and running a collection of commands in a batch file, as examples.

In most computer systems, the OS does not work alone. Typically, it depends not only on the cooperation of other programs, but also on meshing smoothly with the computer system's Basic Input/Output System (BIOS) and software drivers. The BIOS generally acts as an intermediary among the hardware, processor, and OS of a computer system. Device drivers are like a specialized BIOS. Such drivers typically translate commands from the OS and BIOS into instructions for a specific piece of hardware, such as a printer, scanner, or CD-ROM drive, as examples.

During the boot-up process of most computer systems, firmware implementing the system's BIOS is first used to initialize the computer's devices sufficiently for loading the OS from disk to the system's random access memory (RAM). That is, BIOS boot code stored in the system's read only memory (ROM) is first invoked to control initialization of the system's hardware devices and begin loading of the system's OS. During such boot-up process, the BIOS may identify the hardware resources of the computer system and may make sure that the resources, such as the central processing unit (CPU), memory, etc., are functioning properly (e.g., by performing a power on self-test (POST)). Once the OS is loaded, control of the system is passed over to such OS. In a plug-and-play system, a resource arbitrator may be included in the OS to decide what resources (e.g., interrupts, etc.) to allocate to each device coupled to the system.

As the complexity of computer systems have evolved, techniques have been developed for managing the power consumption of such computer systems. For instance, BIOS-based power management techniques for implementing Advanced Power Management (APM) have been used in some computer systems. With such traditional APM techniques, the OS has no knowledge of the APM being implemented. Because problems caused by the APM may appear to users to be caused by the OS, many OS developers prefer to have a power management technique implemented that is directed by the OS. Accordingly, more recently an interface specification known as Advanced Configuration and Power Management Interface ("ACPI") has been developed for OS-directed power management (OSPM) and configuration.

ACPI is an open industry specification co-developed and released to the public by COMPAQ Computer Corporation, INTEL Corporation, MICROSOFT CORPORATION, PHOENIX Technologies Ltd., and TOSHIBA Corporation. The ACPI specification was developed to establish industry-standard interfaces for OS-directed configuration and power management on computer systems, such as personal computers (PCs), laptops, desktops, and servers. ACPI is a key element in OS-directed configuration and Power Management (OSPM). In general, OSPM is a model of power (and system) management in which the OS plays a central role and uses global information to optimize system behavior for the task at hand. ACPI is a well-known, evolving standard in the existing art, and the current versions of ACPI are described in greater detail in "Advanced Configuration and Power Interface Specification, Revision 2.0 Errata, Errata document" Revision 1.5 (Apr. 13, 2001), and "Advanced Configuration and Power Interface Specification" Revision 2.0a (Mar. 31, 2002), the disclosures of which are hereby incorporated herein by reference. The ACPI specification defines the ACPI interfaces, including the interface between the OS software, the hardware, and the BIOS software. In addition, the specification also defines the semantics of these interfaces.

ACPI evolves the existing collection of power management BIOS code (APM) application programming interfaces, Multiprocessor Specification (MPS) tables, and so on into a well-defined power management and configuration interface specification. ACPI provides the means for an orderly transition from existing (legacy) hardware to ACPI hardware, and it allows for both ACPI and legacy mechanisms to exist in a single machine and to be used as needed.

Accordingly, ACPI defines an extensible means by which an OS can be given greater control over the power management and resource management in computer systems. For instance, ACPI defines a hardware and software interface by which an OS can manipulate the characteristics of the system's hardware resources (e.g., motherboard devices). This technology differs from traditional BIOS-based technologies in at least two regards: (i) the BIOS support code is written in a p-code called ACPI Machine Language ("AML"), discussed further herein, rather than in the native assembly language of a platform; and (ii) the BIOS support code does not determine the policies or time-outs for power or resource management. Rather, these polices are determined by the OS.

The ACPI hardware interface provides functionality to the OS in at least two categories: (i) control/detection of system control events using a normal interrupt known as System Control Interrupt ("SCI"), and (ii) control of the system power state. The details of a platform's support for the hardware interface are provided in a set of well-defined tables (referred to as "ACPI tables") within the system BIOS.

AML is pseudo-code for a virtual machine supported by an ACPI-compatible OS and in which ACPI control methods (described further below) are written. That is, AML is a pseudo-code assembly language that is interpreted by an OS driver. Chapter 17 of the "Advanced Configuration and Power Interface Specification" Revision 2.0a, published Mar. 31, 2002, describes the ASL reference, the disclosure of which is incorporated herein by reference. ACPI Source Language (ASL) is the programming language equivalent for AML. ASL is the programming language typically used by developers (e.g., OEMs and BIOS developers) to create source code that is compiled into AML images. That is, ASL is the source language typically used for writing ACPI control methods. The ASL code is then translated by a translation tool to AML code versions of the control methods. It should be noted that ASL and AML are different languages although they are closely related.

A control method is a definition of how the OS can perform a simple hardware task. For example, the OS may invoke control methods to read the temperature of a thermal zone. Control methods are written in AML, which can be interpreted and executed by the ACPI-compatible OS. Typically, an ACPI-compatible OS provides a set of well-defined control methods that ACPI table developers can reference in their control methods. Thus, for example, OEMs can support different revisions of chip sets with one BIOS by either including control methods in the BIOS that test configurations and respond as needed or including a different set of control methods for each chip set revision.

The ACPI software interface provides a capability for the OS to find the different ACPI-related tables in the system BIOS and for the OS to understand and control the characteristics of certain hardware devices using AML. The AML resides in the ACPI tables within the system BIOS. Thus, ACPI tables are constructed that describe, for the system's OS, hardware resources that may be available to the computer system. Such descriptions in the ACPI tables may comprise AML code for a hardware resource that defines a control method (e.g., for a hardware-specific function) that may be used by the OS.

An OS that is ACPI-enabled comprises an interpreter for AML. While use of ASL is not mandatory, most developers typically use ASL as their preferred source language. At least in theory, a user can develop their own arbitrary source language, and use a translator to translate this arbitrary source language into AML. AML is the language processed by the ACPI method interpreter. It is primarily a declarative language and provides a set of declarations that is compiled by the ACPI interpreter into the ACPI namespace at definition block load time. The ACPI Namespace is, a hierarchical tree structure in OS-controlled memory that comprises named objects. These objects may be data objects, control method objects, bus/device package objects, and so on. The OS dynamically changes the contents of the namespace at runtime by loading and/or unloading definition blocks from the ACPI tables that reside in the ACPI BIOS.

BRIEF SUMMARY OF THE INVENTION

According to an embodiment of the present invention, an ACPI-compatible system is provided that comprises a database for storing a device-specific descriptor for a hardware device. The system further comprises an ACPI agent operable to autonomously construct an ACPI table entry for the hardware device using the device-specific descriptor.

Also, according to an embodiment of the present invention, a method for an ACPI-compatible system autonomously constructing an ACPI table entry for a hardware device is provided. The method comprises receiving from firmware associated with the hardware device, a device-specific descriptor for such hardware device, and an ACPI agent executing on the ACPI-compatible system using the device-specific descriptor to autonomously construct an ACPI table entry for the hardware device.

Further, according to an embodiment of the present invention, an ACPI-compatible system is provided that comprises a means for storing a device-specific descriptor for a hardware device. The system further comprises a means for autonomously generating AML code for the hardware device using the device-specific descriptor.

DETAILED DESCRIPTION

Figure 1:
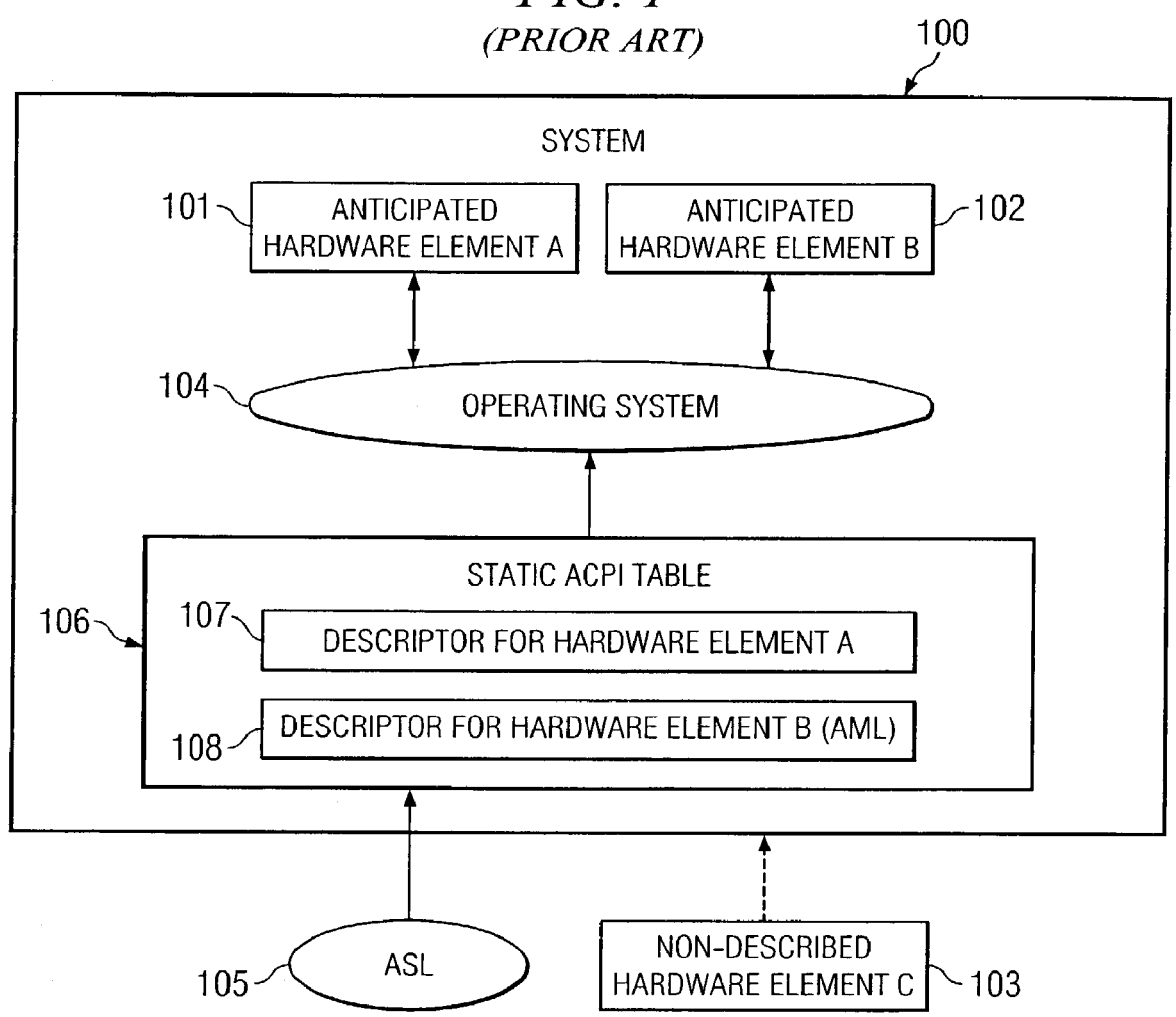
FIG. 1 shows an example implementation of a traditional ACPI-compatible system that uses static AML generation.

One feature of AML is that its access to memory, I/O, and PCI configuration space is either static or else the capabilities provided for dynamic values are so limited as to be largely useless because they are: (a) evaluated at the time when the AML is first loaded by the OS; and (b) are very difficult to modify at that point.

As mentioned above, some operating systems, such as WINDOWS 2000, expect the computer systems on which they are implemented to support ACPI. For example, quoting from the most recent version of the Hardware Design Guide Version 3.0 for WINDOWS 2000 Server:

> ACPI version 2.0 will address requirements for both IA-32 and IA-64 systems. In this version of the Hardware Design Guide, ACPI Version 2.0 is required for all IA-64 systems, because it is the first version of the ACPI specification that addresses the specific requirements for IA-64 systems with regard to ACPI firmware, hardware, and motherboard support. In particular, the ACPI 2.0 specification defines expanded interfaces to support IA-64, with extended Table definitions and new ACPI Source Language (ASL) and ACPI Machine Language (AML) 64-bit functions.

Note that a major functional value of the ACPI model is that ACPI provides a technique for firmware to describe the hardware of a computer system to an OS with standard data structures. In addition to the descriptive power of ACPI, hardware-dependent operations may also be provided in the tables as ACPI objects (e.g., control methods that are coded in AML).

The ACPI model provides a portable method for OEM hardware vendors to write hardware-specific operations for standard system functions in a language that works with any OS containing a standard AML interpreter (i.e., any ACPI-compliant OS). Since the methods are stored in ACPI tables that explicitly model the physical hardware, an unambiguous mapping of a standard hardware function (such as power on an I/O slot) to an implementation-specific hardware element is provided to the OS.

The system firmware constructs the ACPI tables prior to their use by the OS. Accordingly, one function of the system firmware is to build ACPI tables. The ACPI architecture, having evolved from laptop product requirements, originally assumed a very simple, motherboard-centric view of system topology. In such systems, most of the hardware had fixed definitions, and the number and location of plug-in hardware, such as modem or local area network (LAN) controllers, was also fixed. As described above, the AML for such systems is typically written by developers in ASL, which is then compiled into AML. The AML is then included as a data section of the normal system firmware. Such AML has traditionally been generated and stored in the data section of the system firmware before boot-up of the computer system, wherein such AML describes system resources (e.g., hardware devices) that are anticipated as possibly being present in the computer system. This method of generating AML is referred to herein as "Static AML Generation." As an example, a laptop computer may have a fixed number of slots in which hardware devices may be coupled, and therefore AML code may be developed through Static AML Generation (in advance of booting the laptop) for defining ACPI objects (e.g., control methods) for a fixed number of hardware devices that may be coupled to the laptop computer.

At the appropriate time during firmware initialization, the ACPI tables that include AML code are copied from ROM into main memory from which the OS retrieves the data. Sometimes the non-AML fixed tables are built by firmware code at boot time; sometimes they are part of the ASL-built binary and also copied. But in all of the traditional ACPI-compatible systems, the AML byte-coded tables are pre-compiled and built into the system's ROM image.

In view of the above, prior solutions for generation of AML involve compilation of AML from ASL into fixed, static tables in the firmware ROM (i.e., ACPI tables). Subsequently these tables are copied from the ROM into the system RAM during firmware initialization. This approach is suitable for systems in which the hardware configuration is known ahead of time, or when the configuration variation is limited. For simple, laptop computers (where ACPI was first employed), or small servers in which addressable resources are not added or removed, and at most, peripheral cards or devices may be added and removed, static AML generation may be suitable. However, for highly configurable systems, such as cellular servers where aggregations of CPUs, memory controllers, and I/O link controllers may be added or removed from a running system, use of static AML tables is problematical.

Referring to FIG. 1, an example implementation of a traditional ACPI-compatible system that uses static AML generation is shown. As shown, a system 100, such as a PC, laptop, desktop, server, or other processor-based device, may comprise anticipated hardware elements A and B (labeled 101 and 102, respectively). That is, before boot-up of system 100, it is anticipated that hardware elements A and B may be included therein. System 100 further comprises an OS 104, such as WINDOWS 2000, WINDOWS NT, or other ACPI-compatible OS. A developer (e.g., OEM or BIOS developer) typically uses ASL 105 to construct AML code that defines control methods (e.g., hardware-specific functions) for the anticipated hardware devices 101 and 102. Static ACPI table(s) 106 are then stored in the system's ROM and comprise descriptors 107 and 108 for anticipated hardware elements A and B, respectively. If AML code is needed for an anticipated hardware element, such as element B in this example, the generated AML code is stored in the descriptor for such hardware element (e.g., descriptor 108 in this example) in ACPI table 106. One or more of anticipated hardware elements A and B may not actually be present in system 100, but any of such anticipated hardware elements may be included therein, as they are each described in pre-defined, static ACPI table 106.

It should be recognized that such static generation of AML is restrictive in that it requires all hardware elements of system 100 to be described in pre-constructed ACPI table(s). Thus, if a non-described hardware element (that is not pre-described in ACPI table 106) is desired to be added to system 100, such as hardware element C (labeled 103 in FIG. 1), such unexpected hardware element is incapable of being added to system 100 during the system's runtime because it is not pre-described in the static ACPI table 106. Such non-described hardware element C may be referred to as "unexpected" in that it is not pre-described in ACPI table 106. As an example, assume that non-described hardware element C is desired to be added to system 100, and further assume that certain AML code is desired to be implemented for defining a control method (e.g., hardware-specific function) for hardware element C; the hardware element C cannot be added to system 100 during the system's runtime because the needed AML code has not been previously included in the static ACPI table 106. Accordingly, to add non-described (or "unexpected") hardware element C into traditional system 100, system 100 would be shutdown and a new/updated static ACPI table 106 would be created that includes the needed AML code for hardware element C, and then system 100 would be re-started.

Thus, traditional computer systems may "grow" statically. In this sense, the system "grows" in that it expands to include hardware resources that were not initially anticipated to be included in the system. For instance, a user may purchase a computer system that includes 4 CPUs and is capable of being upgraded to include up to 12 CPUs. That is, the static ACPI table 106 may be pre-constructed to include the necessary descriptors and AML code for all 12 CPUs that may possibly be included in the system. To upgrade the system from 4 CPUs to 12 CPUs, the user traditionally shuts down the system and adds the additional 8 CPUs. Then, when the system is re-started the system firmware recognizes that all 12 of the anticipated CPUs are present in the system and the pre-built, static ACPI table 106 is used for describing the additional 8 CPUs to the OS. However, if the user desires to "grow" the system beyond the initially anticipated 12 CPUs to, for example, implement 20 CPUs therein, the system would need to be shutdown, new AML code generated for the additional, unexpected CPUs (using ASL 105), and such AML code would be stored to the ACPI tables 106 to describe the unexpected CPUs for the OS 104. Thereafter, the system may be re-started and the OS 104 may recognize the grown resources (e.g., the additional CPUs added beyond the initially anticipated 12 CPUs). Thus, the system firmware of traditional systems does not generate the AML code for unexpected hardware dynamically.

As another example, ACPI tables may be pre-constructed that describe 4 slots of a computer system to which hardware may be coupled. Accordingly, hardware may be coupled to the slots without requiring new AML code to be generated for the slots. However, for the system to "grow" by the addition of new slots, further AML code may need to be generated for the newly added slots. Again, the system firmware of traditional systems does not generate the needed AML code for such unexpected hardware resources dynamically.

Because the complexity of computer systems often grows beyond that initially anticipated (and because storing all possible AML code that may be needed for future growth of a computer system consumes an undesirably large amount of memory resources for describing hardware elements that may not actually be present within a system), a desire exists for a system and method that enables a system to dynamically generate AML code needed for hardware elements. That is, a desire exists for a system and method for autonomously generating needed AML code for hardware elements in a computer system as such hardware elements are added to the computer system (e.g., as the computer system "grows").

Figure 2:
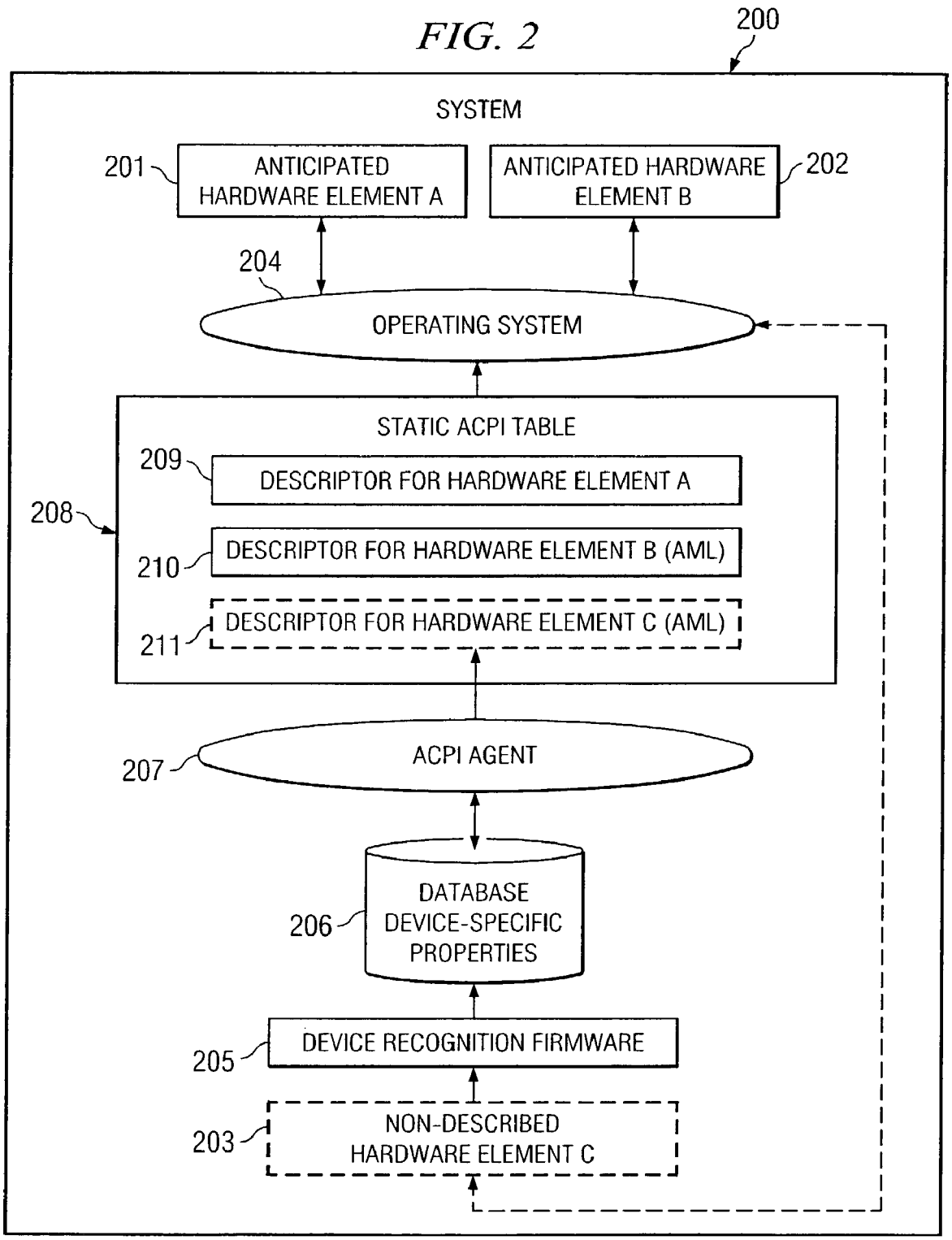
FIG. 2 shows an example implementation of an embodiment of the present invention.

Referring to FIG. 2, an example implementation of an embodiment of the present invention is shown. As shown, system 200, such as a PC, laptop, desktop, server, or other processor-based device, comprises anticipated hardware elements A and B (labeled 201 and 202, respectively). That is, before boot-up of system 200, it is anticipated that hardware elements A and B may be included therein. System 200 further comprises an OS 204, such as WINDOWS 2000, WINDOWS NT, or other ACPI-compatible OS. Static ACPI table(s) 208 are stored in the system's ROM and comprise descriptors 209 and 210 for anticipated hardware elements A and B, respectively. If AML code is needed for an anticipated hardware element, such as element B in this example, the generated AML code is stored in the descriptor for such hardware element (e.g., descriptor 210 in this example) in ACPI table 208.

If non-described hardware element C (labeled 203), for which a descriptor is not pre-defined in ACPI table 208, is desired to be added to system 200, an embodiment is operable to autonomously dynamically generate an ACPI table entry that includes any added AML code therein for supporting hardware element C. Non-described hardware element C may be referred to herein as "unexpected" hardware element C because it is not pre-described in ACPI table 208, although (as described further below) in an embodiment the system "expects the unexpected" so to speak in that it expects to receive non-described hardware elements and is capable of dynamically describing such newly received hardware elements in the ACPI tables 208. More specifically, in an embodiment, upon hardware element C being added to system 200 (e.g., being communicatively coupled to system 200), device recognition firmware 205 recognizes such hardware element C and may interact therewith to construct a description of its device-specific properties, which device recognition firmware 205 stores to database 206. ACPI agent 207 may then execute to access database 206 and utilize the device-specific properties stored therein for hardware element C to generate any AML code that supports hardware element C. ACPI agent 207 then creates a new entry (e.g., a new descriptor) 211 in ACPI table 208 that includes the added AML code, if any, for hardware element C. OS 204 is then notified that a new ACPI table entry is available, and OS 204 may then utilize ACPI table 208 for managing operation of hardware element C appropriately, just as with hardware elements A and B.

In view of the above, the embodiment provides a system that is capable of autonomously generating entries in a static ACPI table dynamically. That is, as new hardware is added to system 200, the system may autonomously generate the supplemental ACPI table entry describing such newly added hardware to OS 204. Further, if AML code is needed for the newly added hardware element (e.g., hardware element C in the example of FIG. 2) to, for example, define control methods (e.g., to define device-specific functions) ACPI agent 207 is preferably capable of autonomously generating such AML code to be included in the ACPI table entry for the newly added hardware element.

Figure 3:
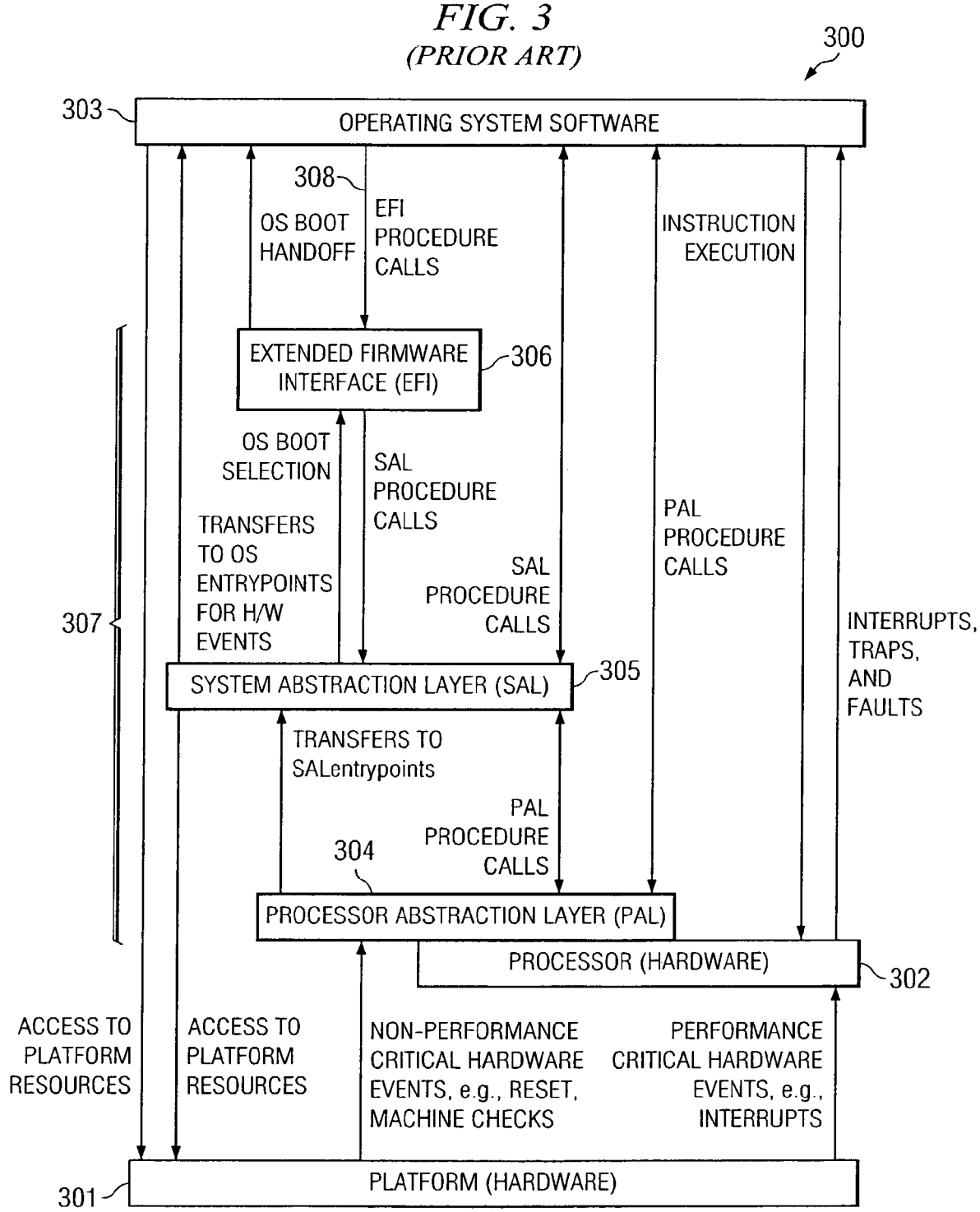
FIG. 3 shows an abstract model of an example system in which embodiments of the present invention may be implemented.

FIG. 3 shows an example context in which embodiments may be implemented. FIG. 3 shows an abstract model of an example system 300, which comprises hardware platform 301, processor(s) 302, OS 303, and system firmware 307. In this example implementation, system firmware 307 comprises a Processor Abstraction Layer (PAL) 304, System Abstraction Layer (SAL) 305, and Extended Firmware Interface (EFI) 306.

Various processor architectures are known in the art, such as the PA-RISC family of processors developed by HEWLETT-PACKARD Company ("HP"), INTEL Corporation's (INTEL) architecture (IA) processors (e.g., the well-known IA-32 and IA-64 processors), and the like. As is well-known, IA-64 is a 64-bit processor architecture co-developed by HP and INTEL, which is based on Explicitly Parallel Instruction Computing (EPIC). I The example system 300 shown in FIG. 3 follows the well-known IA-64 architecture, such as is implemented for the well-known ITANIUM Processor Family (IPF). While embodiments of the present invention may be implemented within any other suitable system architectures that utilize ACPI (and therefore are not limited solely to the IA-64 architecture shown in FIG. 3), an embodiment of the present invention is described hereafter as being implemented within the IA-64 (e.g., IPF) system architecture of FIG. 3. The IA-64 processor architecture definition specifies requirements for firmware architecture elements of systems utilizing IA-64 processors. The quintessential model of this architecture is given in the *Intel IA-64 Architecture Software Developer's Manual, Volume* 2: *IA-64 System Architecture,* in section 11.1 *Firmware Model.* It describes that the IA-64 firmware comprises three major components: PAL 304, SAL 305, and EFI 306, which together provide the processor and system initialization for an OS boot.

The three components 304, 305, and 306 may not represent all of the system firmware functionality for standard IA-64 computer systems that are ACPI compatible. In ACPI-compatible systems, it is expected, but not required, that the SAL component 305 of a platform firmware implementation be written to fulfill the ACPI requirements.

Hardware platform 301 represents the collection of all of the hardware components of system 300, other than the system's processors 302. The arrows shown in the abstract model of FIG. 3 between these various components indicate the types of interactions for the behavior of system 300. When system 300 is first powered on, there are some sanity checks (e.g., power on self-test) that are performed by microprocessors included in platform 301, which are not the main system processors 302 that run applications. After those checks have passed, then power and clocks are provided to processor 302. Processor 302 begins executing code out of the system's ROM (not specifically shown in FIG. 3). The code that executes is the PAL 304, which gets control of system 300. PAL 304 executes to acquire all of the processors 302 such that the processors begin executing concurrently through the same firmware.

After it has performed its duty of initializing the processor(s) 302, PAL 304 passes control of system 300 to SAL 305. It is the responsibility of SAL 305 to discover what hardware is present on platform 301, and initialize it to make it available for the OS 303, primarily main memory. When main memory is initialized and functional, the firmware 307 (i.e., PAL 304, SAL 305, and EFI 306, which is not running yet) is copied into the main memory. Then, control is passed to EFI 306, which is responsible for activating boot devices, which typically includes the disk. EFI 306 reads the disk to load a program into memory, typically referred to as an operating system loader. EFI 306 loads the OS loader into memory, and then passes it control of system 300 by branching one of the processors 302 (typically called the boot startup processor) into the entry point of such OS loader program.

The OS loader program then uses the standard firmware interfaces 307 to discover and initialize system 300 further for control. One of the things that the OS loader typically does in a multi-processor system is to retrieve control of the other processors. For instance, at this point in a multi-processor system, the other processors may be executing in do-nothing loops. In an ACPI-compatible system, OS 303 makes ACPI calls to parse the ACPI tables (described further hereafter in conjunction with FIG. 5) to discover the other processors of a multi-processor system 300. Then, OS 303 uses the firmware interfaces 307 to cause those discovered processors to branch into the operating system code. At that point, OS 303 controls all of the processors and the firmware 307 is no longer in control of system 303.

As OS 303 is initializing, it discovers from the firmware 307 what hardware is present at boot time. And in the ACPI standards, it also discovers what hardware is present or added or removed at run-time. In discovering hardware that may be present in the system, OS 303 accesses the system's ACPI table(s). Various techniques are disclosed herein address techniques for dynamically changing the content of those ACPI tables. The OS uses function calls during the system initialization to find out the address of the ACPI tables. A pointer to those ACPI tables is passed in the EFI system table pointer 501 (see FIG. 5), which is obtained by making one of the standard EFI procedure calls 308 in FIG. 3. So, EFI procedure calls 308 are used to pass the address of the ACPI tables (shown in FIG. 5) which describe the hardware of system 300. Such ACPI tables that OS 303 accesses at boot time describe the resources available to system 300. For instance, the ACPI tables describe the hardware that is present and the hardware slots that hardware could be plugged into. For example, system 300 may be a laptop that comprises a slot for receiving an Ethernet card (although it may not actually have an Ethernet card coupled to it). The slot is known as an ACPI resource and it is described at the laptop's boot time in the laptop's ACPI tables. When an Ethernet card is plugged into the slot, OS 303 gets a notification from platform 301 and OS 303 then accesses the ACPI table and it determines how to activate a device driver for that device (using information provided in the ACPI table).

Figure 4:
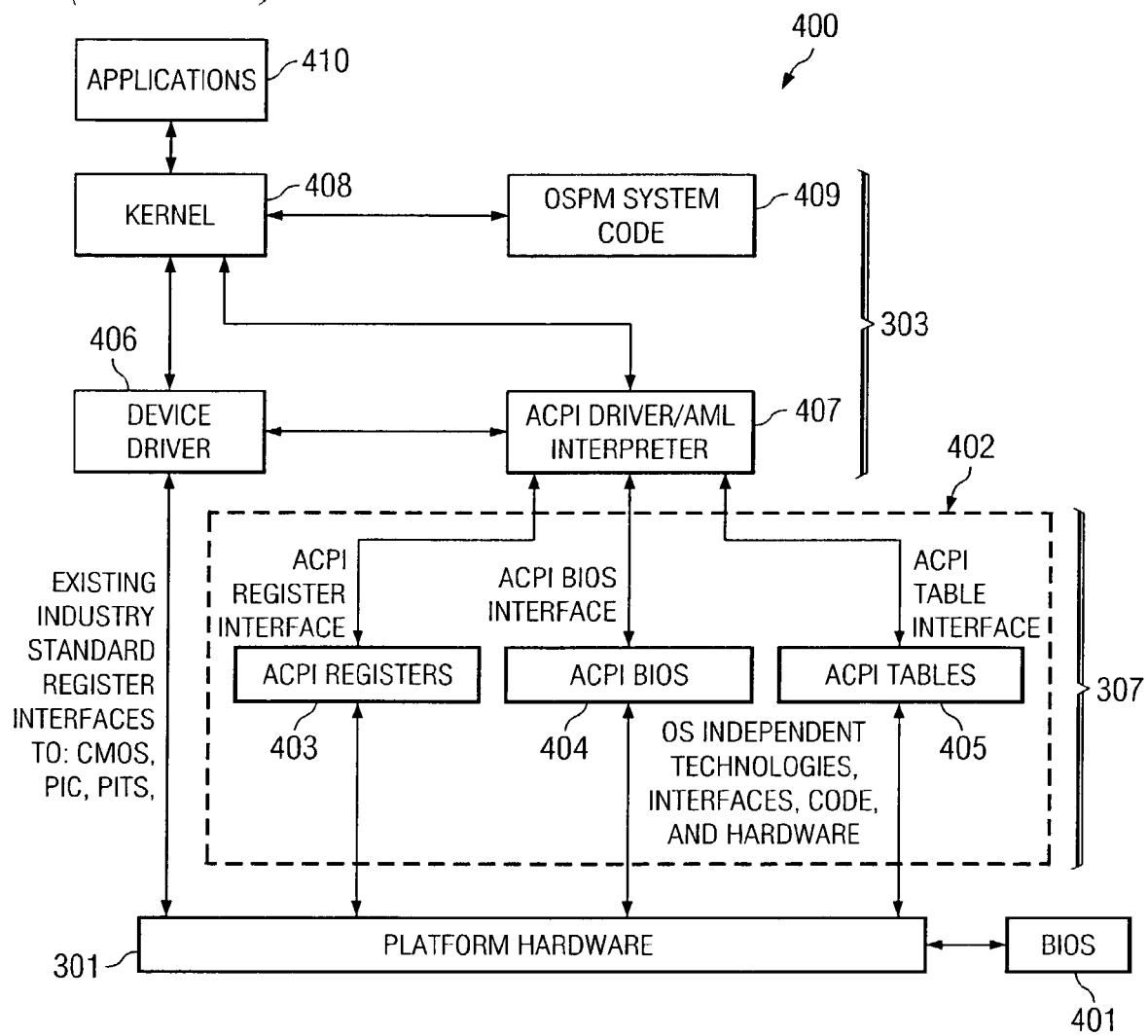
FIG. 4 shows an example block diagram illustrating the relation between ACPI elements and other system elements in an ACPI-compatible system.

Referring to FIG. 4, an example software system diagram is shown that illustrates the relations between ACPI system elements and other system elements. That is, FIG. 4 is a block diagram that defines the software and hardware components relevant to ACPI and how they relate to each other. It should be noted that FIG. 4 is taken directly from section 1.6 of "Advanced Configuration and Power Interface Specification" Revisions 2.0a (Mar. 31, 2002) and is also described therein. The ACPI specification 402, which is implemented in system firmware 307 (of FIG. 3), describes the interfaces between the components, the contents of the ACPI tables, and the related semantics of the other ACPI components. ACPI tables 405 are a defining construct of an ACPI implementation and the role of an ACPI-compliant BIOS is primarily to supply the ACPI tables rather than an Application Programming Interface (API).

FIG. 4 shows the three run-time components of ACPI:

(1) ACPI Tables 405—These tables describe the interfaces to the hardware. Those interfaces can take a variety of configurations and include the descriptions in AML code. Some of the descriptions limit what can be built (although most descriptions allow the hardware to be built in arbitrary ways), and can also describe arbitrary operation sequences needed to make the hardware function. Since ACPI tables 405 can make use of AML, which is interpreted, OS 303 includes an AML interpreter 407 that executes procedures encoded in AML and stored in ACPI tables 405.

(2) ACPI Registers 403—These are a limited part of the hardware interface, and are described, at least in location, by ACPI tables 405.

(3) ACPI BIOS 404—refers to the part of the firmware 307 that is compatible with the ACPI specifications. It should be noted that ACPI BIOS 404 is normally not separate from system BIOS 401 but is shown in this example as a separate component to emphasize its additional functionality and compatibility with the ACPI specifications. Therefore, ACPI BIOS 404 (in IA32 systems) or SAL 305 (in IPF systems) includes code that boots system 400, as well as implementing interfaces for sleep, wake, and some restart operations.

Device Driver 406 represents any one of a number of OS components for managing and controlling specific hardware devices attached to the computer system. An example is a SCSI (small computer system interconnect) disk controller and disk drive. Another example is an ethernet controller. The device driver 406 provides an abstraction to the rest of the OS kernel 408 (e.g., so that the OS itself does not have to know about the differences between different brands and models of SCSI controllers or types of other hardware devices). Both the OS kernel 408 and device drivers 406 interact with the ACPI interpreter system 407 using OS specific interfaces in the OSPM System Code 409 to the standard ACPI interpreter abstractions that the ACPI architecture provides. For example, the AML interpreter 407 receives virtual-memory services from the OSPM System code 408 when it creates a mapping for an operation region declared by the AML in the ACPI tables 405. Without a virtual mapping, the AML that wants to access hardware through the OS-mediated AML interpreter 407 is unable to do so to achieve access to its operation region.

Figure 5:
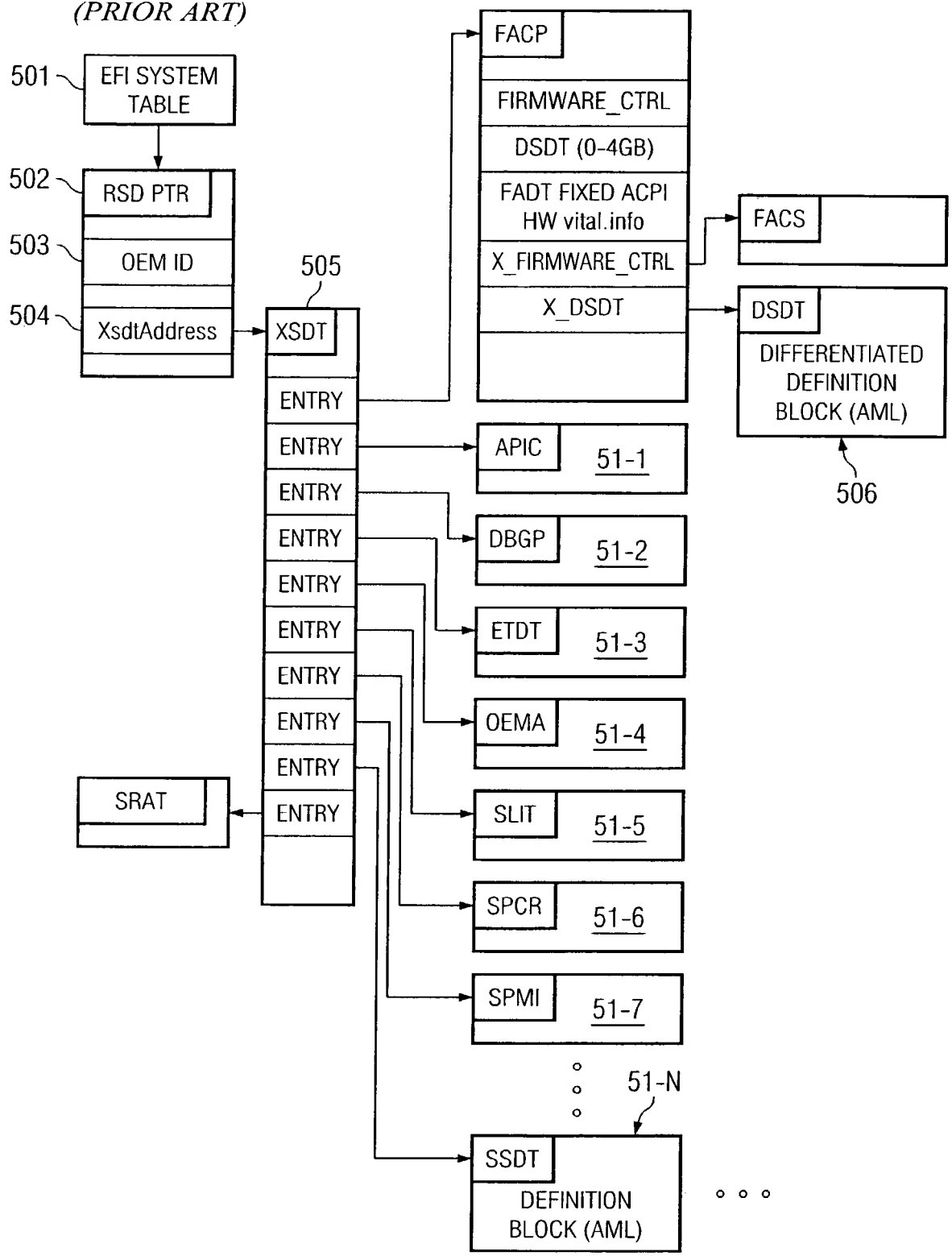
FIG. 5 shows an example high-level block diagram of implementing ACPI tables.

FIG. 5 shows a high-level block diagram of ACPI tables, as they are commonly implemented in an ACPI-compatible system. The system firmware 307, (SAL 305 in the IPF model, BIOS in the IA32 model) constructs these ACPI tables prior to their use by OS 303. FIG. 5 illustrates the connection between the EFI interfaces and the ACPI tables. EFI 306 provides a pointer 501 to the root of the ACPI tables in IPF systems. FIG. 5 also illustrates the elements of the ACPI tables that are presented as AML.

Thus, FIG. 5 is a conceptual model of the software descriptive data structures that are commonly implemented for ACPI-compliant systems. Element 501 is the beginning of the data structure (referred to herein as an "ACPI table"). ACPI tables are an architected set of data structures, whose relations to each other are architected but whose specific content may vary by hardware platform. So, an OS may include a traversal algorithm, and that algorithm will work on any system that follows the architected rules for the ACPI tables. The beginning of traversing this data structure starts with the pointer 501 given to it by the EFI procedure call 308 from FIG. 3. Operation then advances to the "root system description pointer" (RSD PTR) 502, which is queued by an OEM ID 503. In that is a pointer 504 to what is called the "extended system description table," (XSDT) 505, which is a table that contains a varying number of entries. Each entry points to another table item, such as items 51-1 through 51-N. Of those items shown, some may be required, and some are not required. If they are present they have a header format to identify to OS 303 what they are supposed to describe. Depending on what they describe, their internal format will vary. Examples of these items are the interrupt descriptions 51-1, and the debug table (which is shown as DBGP 51-2).

Item 51-N is called Secondary System Description Table ("SSDT"), which includes blocks of description that contain AML for hardware elements (SSDT is described further on page 17 of "Advanced Configuration and Power Interface Specification" Revision 2.0a). Additionally, Differential System Description Table ("DSDT") is a fixed table that includes AML (DSDT is described further on page 14 of "Advanced Configuration and Power Interface Specification" Revision 2.0a). Tables 51-N and 506 describe both functional methods and descriptive objects in the ACPI Namespace.

Figure 6:
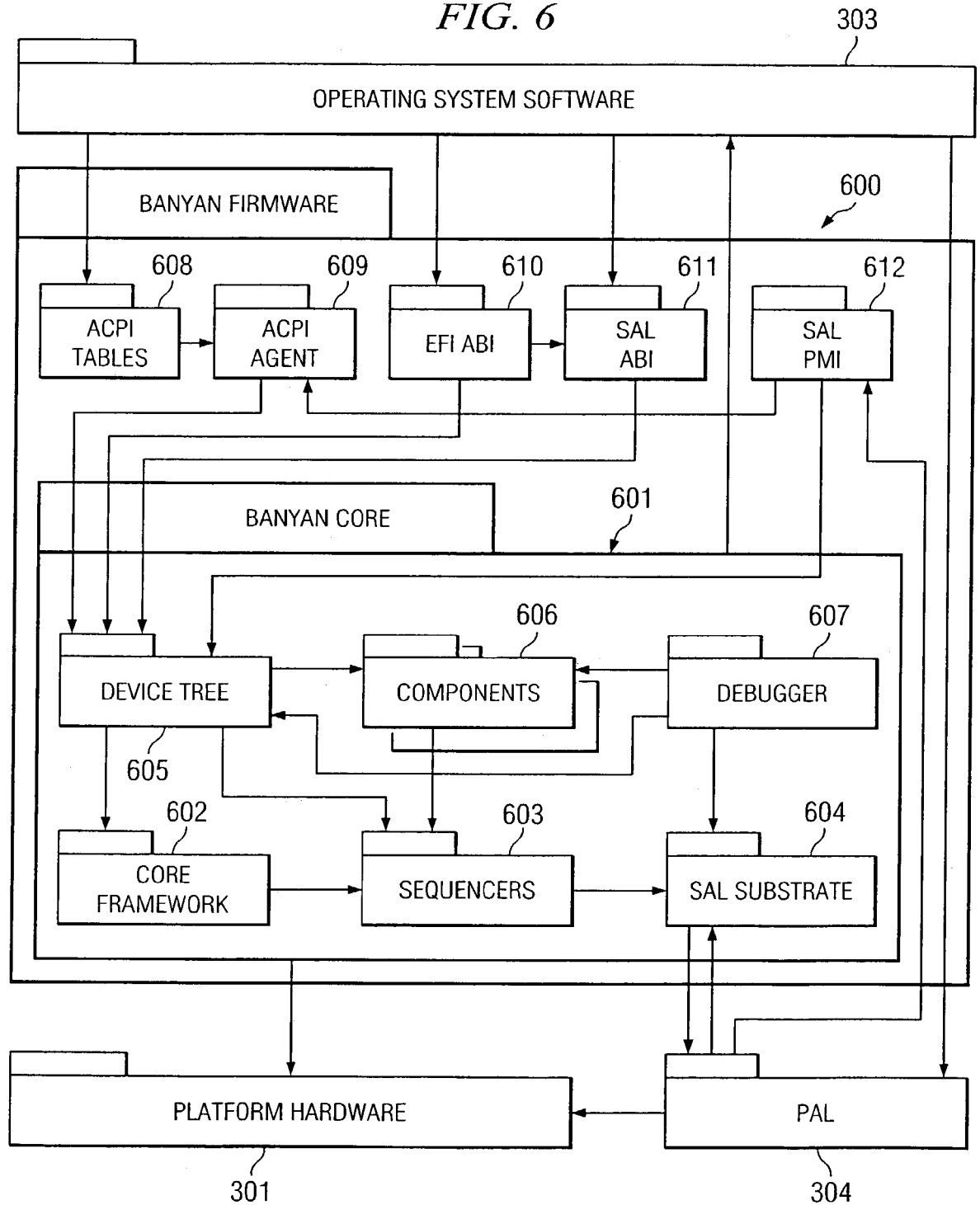
FIG. 6 shows a block diagram of a system architecture in which an embodiment of the present invention is implemented.

So, OS 303 traverses this architected data structure known as the ACPI table, and converts it from this representation that firmware gives it into some equivalent representation in its main memory, augmented with an ACPI interpreter and interrupt structure, and the AML code for executing methods. The AML code executes within ACPI, which means that it does not execute in the firmware ROM but instead executes inside the OS 303. The OS 303 provides a type of protection environment such that if the AML has bugs, the OS is still protected from failing (e.g., going "blue screen"). Generally, a system exposes a single DSDT table 506 containing AML, but it may provide zero or more SSDTs 51-N also containing AML. The AML objects are loaded by the OS 303 into an architected model called the ACPI Namespace. This namespace provides the architected runtime environment for the ACPI objects. SSDT objects 51-N may be loaded or unloaded dynamically, though the ACPI standard defines no implementation for accomplishing this function. The described system can dynamically generate these SSDTs 51-N and/or DSDTs 506 for new hardware being added to the system. The described system can dynamically remove such tables (e.g., using an Unload ( ) operator) for hardware being removed from the system The illustrative technique enables a system to autonomously generate needed ACPI table entries (e.g., AML code) dynamically, during system runtime, for new resources grown by a computer system and/or remove ACPI table entries for removed hardware resources. Some embodiments are implemented in a system architecture referred to herein as the Banyan system. Of course, alternative embodiments may be implemented within other system architecture. FIG. 6 shows an example block diagram of the Banyan system. The Banyan firmware system 600 is an application of a Framework plus Components model. A framework is a domain-specific set of software functionality that comprises the major body of the system functionality. Components interact collaboratively with the framework and each other via clearly defined interfaces to achieve the overall system function. Frameworks are generally hard to develop, hard to learn, and are domain specific. However, if they are very well done, they are also the best means to achieve the highest levels of reusability.

The Framework plus Components model is appropriate for implementing firmware for a growing system because the system's hardware will vary by components. That is, the hardware that utilizes new or additional firmware will change, but much of the functionality of the system stays the same. So, much of the system firmware's functionality, such as the coordination of the elements, the discovery of hardware, matching the firmware to the discovered hardware either at boot time or when the hardware is activated, etc., may be implemented in the framework, such that much of the firmware is reusable across different components, and hardware-specific portions of the firmware may be implemented as components in the Framework Plus Components Model.

Elements of this example Banyan architecture 600 are described as follows:

(1) ACPI Tables 608: ACPI tables 608 are described more fully above in conjunction with FIG. 5.

(2) ACPI Agent 609: ACPI Agent 609 exports ACPI (standard) firmware functionality. In this model, it is code that is given control during bootstrap, after the core 601 is initialized, during which it converts the representations of the system used internally to those used by the external standards. It is similar to a proxy design pattern in that it separates evolution of the ACPI interface from those employed internally to describe the system and to control some hardware functions.

(3) EFI ABI 610: EFI ABI 610 is the IA64 standard set of external interfaces (procedure call based) that provides boot services to the OS loader and early OS initialization code. It also contains a very minimal set of runtime services that are available even after the OS is given full control and when the boot-time services become unavailable. The EFI package may also contain an EFI-boot-driver runtime infrastructure to support standard EFI boot drives.

(4) SAL ABI 611: This veneer (another Adapter Pattern) implements the standard IA64 firmware procedure interfaces used by the IA64 architecture. It also implements the OEM-specific procedures for product differentiation functions. Internally, there may be separation of OEM specific functionality into a sub-package or separate component(s).

(5) Portable Core (or "database") 601: This is a multi-package database, implementing a number of capabilities. A complete, dynamic description of the system hardware configuration is maintained in a subsystem that implements the "Device Tree" architectural pattern 605. Core I/O drivers, such as console, for bootstrapping the framework are part of this package as are remote console protocols, debugger support 607, system initialization coordination, error handling coordination, and essentially most of the firmware system functions that can be made portable. The elements of the core 601 are described more fully as follows:

(a) Device Tree 605: The Banyan Component Tree package which is a dynamic system of bound-components representing the system platform hardware and software components.

(b) Tree Components 606: This represents the aggregation of loosely coupled binary images of components available for instantiating into the device tree 605. Some are "software packages" representing sharable services such as network protocols, buffer caching, et., and others are "hardware packages" that implement "device nodes" in the tree that correspond to actual system hardware components. The instantiated components reside in the component tree that is constructed at boot time.

(c) Debugger 607: This package represents an interactive debugger function that supports both local and remote models of debugging. The remote model can be connected through any supported device (typically a serial or LAN connection). The local debugger is expected to be used through a direct link connection. Local debugging may not support source level debugging because required symbol tables may not be available. The debugger package is expected to be composed of several Banyan components.

(d) Core Framework 602: The supporting services that include memory management, primitive console etc., that support the device tree package 605, but which are better collected outside of that package for modularity purposes. The major "component binding" and "component framework" infrastructure error handling infrastructure, and "OS-like" infrastructure (locking primitives, lock tracing, event logging, etc. may be implemented here).

(e) Event Sequencer 603: The two primary kinds of events that use sequencing include initialization events and error handling events. This package does not represent a centralized handling mechanism; rather we think of this as a "conductor" of an "orchestra" of different musicians. Each musician knows how to play its own instrument (init, handle error) but not the score of the entire symphony. The conductor knows the score, but not how to play each instrument. He serves as "coordinator". This provides the benefits of both a distributed error handling system and a centralized error handling system without the detriments.

(f) SAL Substrate 604: This package represents the SAL_ENTRY functionality that matches the PAL requirements. It also contains platform dependent fabric initialization primitives and error handling framework. There is also a set of platform-independent functionality that is or may be processor instruction set dependent. Processor model-dependent code can be implemented in this substrate package or in the device node that corresponds to the processor (or a combination of both). SAL_Substrate also exports services to other packages and component tree components.

In an embodiment, a firmware element is implemented for each hardware element of a computer system. At the system's boot time, the firmware discovers what hardware is present in the system, and it dynamically composes a running program that comprises a number of separate programs called components. Each one of the components include some of the firmware to build an ACPI table. Accordingly, whenever a new hardware element is added to the system, it may have some firmware associated with it that is activated. That associated firmware may include the AML needed for this hardware element. In certain implementations the associated firmware may comprise information in addition to or instead of such AML code which the ACPI Agent may use to generate the appropriate AML code for the hardware element. Database 601 (shown as database 206 in FIG. 2), which may be referred to herein as the "Banyan Core," is constructed, and it describes the newly added hardware element precisely. In a preferred embodiment, part of database 601 may include all or some of the needed AML (if any) for the newly added device. The ACPI agent 609 traverses database 601 of components 606 and generates the ACPI tables 608 that are used to describe the system's hardware elements for the OS 303.

An element of the Banyan framework 600 is the explicit model of the hardware that the firmware manages. This model is a database (or "device tree") 605 As the system hardware itself is built of aggregations of aggregated elements, database 605 in Banyan explicitly mirrors these aggregations with the composite software design pattern. The composite pattern resembles a tree, and therefore database 605 may be referred to as the Device Tree.

The Banyan core firmware system constructs a database 601 that explicitly represents exactly what hardware is present and active in the server at the time it is booted. Database 601 is composed of components 606 that manage hardware and comprise both text and data. Components 606 may contain both static initialized data, as well as dynamic data. Each component can publish a set of device-specific properties, or data objects, in the database 601, which can then be queried by any client of database 601 using five simple primitives to iterate over the database. These iterator primitives are implemented in a manner similar to that set forth in the IEEE Standard for Boot firmware (see e.g., page 1275 thereof). An embodiment uses GetProp, GetProplen, NextProp, SetProp, and DeleteProp. In an example implementation of Banyan, these functions are implemented as:

```
STATUS GetProp (dhandle_t Node,
    char *PropertyName,
    void *PropertyValue,
    uint64 ValueSize,
    uint64 *PropertyLength,
    propformat_t *Format);
STATUS GetProplen (dthandle_t Node,
    char *PropertyName,
    uint64 *PropertyLength);
STATUS NextProp (dthandle_t Node,
    char *Current,
    char *Next,
    uint64 (NextSize);
STATUS SetProp (dthandle_t Node,
    char *PropertyName,
    void *PropertyValue,
    uint64 PropertyLength,
    PROPFORMAT_T fORMAT);
STATUS DeleteProp (dthandle_t Node,
    char *PropertyName);
```

After the core 601 is initialized, the firmware package called the ACPI Agent 609 gets control before the boot manager is launched to load the OS 303. The job of the ACPI Agent 609 is to build the ACPI tables 608 (shown in greater detail in FIG. 5). Because the hardware specific text and data are contained inside hardware-specific components 606, the ACPI agent 609 only has to understand the ACPI abstractions, not the specific hardware of a given platform 301. Thus, the example Banyan architecture 600 enables a separation of concerns (standard table formats from specific hardware) plus the explicit composite pattern database query interface provided in device tree 605, plus the fact that components 606 may contain data objects (or "properties").

ACPI agent 609 builds ACPI tables 608 used by OS 303 by traversing device tree database 605, extracting expected properties published by architected devices and converting them into the standard ACPI format (1.0 or 2.0). For devices that require AML tables, each component 606 includes a standard-named property that contains all or some of the AML for that device. This AML can be generated dynamically or statically, depending on the need. For example, static AML methods may be built from ASL source that is included as C language data declarations in the source for each component 606 that requires AML in the ACPI tables 608. However, since the method that ACPI Agent 609 uses to retrieve the AML object from each component 606 is simply a data retrieval function, a component may synthesize the AML on demand or it may provide it from initialized data within the component. ACPI agent 609 does not need to know. Thus, ACPI agent 609 may be implemented to perform any of the following: 1) synthesize AML, 2) copy AML that was built from ASL, and 3) generate/compile AML by binary to binary translation or any combination of these three methods.

ACPI agent 609 builds a namespace that corresponds to the topology of the system hardware directly from device tree 605, which also corresponds to the topology of the system hardware. The existence of this device tree 605 and the properties for nodes in the tree makes the dynamic generation of AML a relatively straightforward process. Additionally, ACPI Agent 609 itself can be completely portable (reused in binary form) for any Banyan firmware platform.

AML objects that dereference (access) physical platform resources may do so through access to fields that are named in operation regions. Operation regions are descriptions that provide an AML-to-physical-address mapping that the ACPI interpreter (called the OSPM) in the OS kernel installs in the kernel address space. Without these mappings, AML cannot 'touch' hardware to achieve its functional purpose, such as ejecting a card, or lighting an LED, or enabling a hardware device. In certain embodiments of this invention, the ACPI agent 609 can build operation region descriptions by generating AML directly and dynamically based on data it extracts from the Banyan core device tree 605.

Since device tree 605 can grow and delete branches dynamically, at runtime, new physical resources (in the ACPI model) are added or removed to match the growth and shrinkage of the hardware. If any of these resources are to be accessed by AML, they are accompanied by AML that describes new operation regions. ACPI agent 609 is able to construct new operation region AML dynamically by parsing standard device tree 605 data properties and converting the internal database representation into standard AML SSDTs.

The AML of each component 606 that references these operation regions is written (or generated) knowing that Agent 609 builds the operation regions, which enable its function when the AML is interpreted. For these and other types of AML, the statically compiled AML data properties contain 'unresolved references' and are thus 'incomplete'. The references (to the operation region fields) are unresolved at compile time, and issue a compile warning, but they are otherwise functionally complete. At the time ACPI Agent 609 converts such AML into actual AML it has built the operation region and can resolve the incomplete AML by fixing up the references at runtime, much as a dynamic linker for operating systems does for processes using dynamically linked shared libraries.

In this example implementation, the generation of AML dynamically in the Banyan firmware architecture comprises four main stages. The Banyan Sequencers 603 in FIG. 6 in the core drives the first two steps. The ACPI Client, also known as ACPI Agent 609, guides the last two steps where the AML is generated. It can be noted that ACPI Agent 609 also performs generation of the static ACPI tables 708 that do not contain AML. Examples include the RSDP, XSDT, and HPET. In the example architecture of FIG. 6, device tree database 605 is critical in facilitating correct generation of static tables whose content is hardware-configuration dependent, even though they do not contain AML. Examples of such tables include the SLIT, SRAT, HPET, and MADT. Static table generation is performed just before step 3 below, with some final setup completed following step 4. The four main phases for dynamically generating AML in one embodiment are:

(1) Device Tree instantiation and hardware initialization (Sequencer Driven):

This phase provides per-device properties in an easy to traverse database that reflects the logical organization of the available hardware closely (topologically) to the way the ACPI namespace models hardware.

(2) Device Tree Traversal to generate the AML Objects (Sequencer Driven):

This phase involves invoking the BuildAcpiObjects( ) method in a controlled sequence. This method is exported by every Banyan component that generates AML and is responsible for initializing its list (array) of ACPI object descriptor elements with static and dynamic content based on the ACPI namespace requirements by the component.

(3) Device Tree Traversal to generate ACPI namespace paths (ACPI Client Driven):

In this phase, which is recursive, constructing legal ACPI paths for each component in the device tree develops the skeleton of the ACPI namespace for the computer. The ACPI namespace is essentially a tree-shaped graph that is isomorphic to a subtree of the Banyan device tree, but uses specific syntax to represent the tree paths. Because the Banyan components may be used in different servers with slightly different topological organizations, the ACPI namespace topology cannot be known apriori (before boot). Dynamic Namespace creation and modification is one of the primary problems that dynamic AML generation solves.

(4) Device Tree Traversal to compose the AML DDB tables (ACPI Client Driven):

In this phase, the information stored in the ACPI object descriptor properties and ACPI pathname properties of each component is parsed by the ACPI Agent and AML "Device Definition Blocks" are generated along with their table headers. These tables are placed in (by storing pointers) the XSDT. Finally the checksum and length of the XSDT is computed and the RSDP is set to point to the XSDT, and its address is saved for handoff to the EFI adapter for subsequent delivery to the loaded operating system.

In the first stage described above, device tree database 605 is constructed through a platform-specific sequence of initialization of each firmware component. The Banyan core module known as the Sequencer 503 drives this phase. This tree 605, which is a collection of Banyan components, is an example of the composite design pattern. The Banyan components are said to mirror the logical (a.k.a. programming) view of the computer system. This mapping makes it simpler to create new compositions of firmware components that match new hardware designs.

Each node in tree 605 holds a list of descriptive binary data (known as properties) plus references to executable machine code functions (known as methods) pertinent to the functional responsibilities of that component. This approach is similar to the Object-Oriented programming model whereby instances of classes are known as objects. Some of the properties are standard among all components, such as the name and type properties. Others are specific to that device node. All of the components in device tree 605 that are reflected in the ACPI namespace also possess a property names ACPI_Objects. These objects are lists (arrays) of ACPI object descriptor elements. Three examples of device tree nodes that also have ACPI namespace objects are Processor, Memory and I/O Slot devices. The modularity of the components and inclusion of the component-specific ACPI object knowledge makes the AML generation modular and more reusable as well.

ACPI Agent 609 generates ACPI descriptor table AML (DDB) from a list of ACPI object descriptor elements (a sort of pseudo-ASL), each of which (typically) defines an AML opcode or data object. These object element lists are generated by each Banyan component 606 (during step 2) to describe the AML objects for that component and stored as a global property on a device tree node. Generating a complete descriptor table, therefore, includes processing these object lists from all device tree components to be included in the descriptor tables.

ACPI Agent 609 generates the descriptor table AML using a two-pass approach (steps 3 and 4 above). The first pass is used to generate the ACPI device paths for each component, with these device paths being stored as a global property on each of the component nodes. The second pass generates the actual AML, using the device paths generated from the first pass as necessary.

Figure 9A:
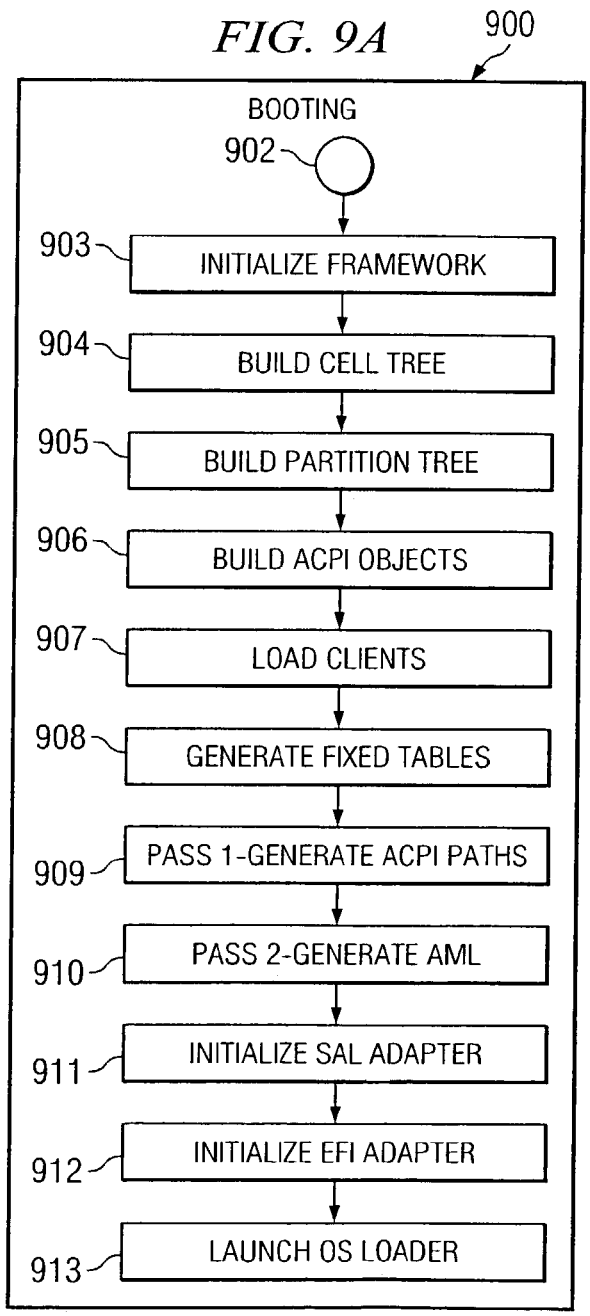
FIGS. 9A-9B show example operational flow diagrams for a system autonomously generating the ACPI table entry (including any needed AML code) for a newly added hardware device in accordance with an embodiment of the present invention.
Figure 9B:
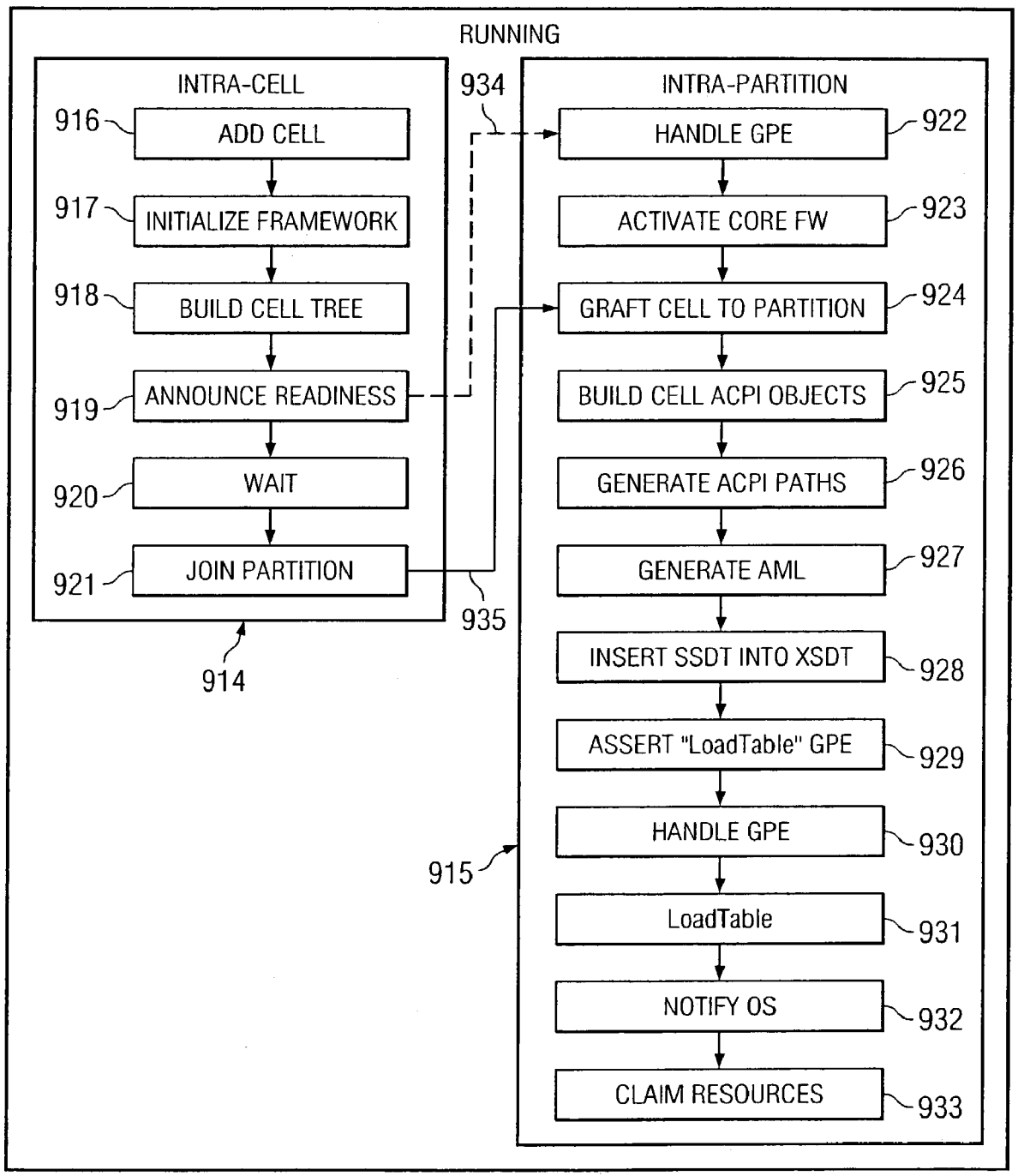

FIGS. 9A and 9B (discussed further below) illustrate two principle use cases supported by the dynamic AML generation functions: Booting and Running. The same functions are used for both; only sequencing their invocations differ.

In the example architecture of FIG. 6, the core cell is always described in the DSDT, as it cannot be removed, while each additional cell is described in a separate SSDT. Separate per-cell SSDT tables are used in this example architecture because of the fact that only tables that have been loaded individually can be individually unloaded from the namespace. When a cell is added to a running system, the key steps of dynamic generation of the AML is identical to that at boottime, but the loading of the new tables to the running namespace involves more complex coordination and the use of the ACPI 2.0 LoadTable, opcode.

FIGS. 9A-9B described below outline how AML generation is accomplished for resources that grow namespace in accordance with one embodiment. Similar collaboration may be performed to remove a cell and prune its corresponding namespace elements through the use of the Unload opcode in certain embodiments.

The conjunction of two aspects of the Banyan architecture enables the dynamic AML generation. These are: (1) the Device Tree 605, which describes the physical topology of the hardware elements that aggregate to form a computer system, and (2), descriptive objects (or "properties") may be included in each node of Device Tree 605. Accordingly, the descriptive objects may define some ACPI properties, which are used by ACPI agent 609. Accordingly, a developer that is writing a new component, for example, may use a real-time clock for his hardware and may develop the AML code for that clock. More specifically, the developer may create a property for the hardware device and the device's firmware writes this property to the database 601 as it is added to the system. ACPI agent 609 may then pick those properties off of the tree 605, and construct them into the ACPI table. Accordingly, the component code for a hardware device (e.g., the code for the real-time clock) only have to include a little ACPI, just the part that is relevant to their hardware, and Agent 609 does not have to know any hardware-specific code, it just has to know how to get them. An embodiment provides a database with the ability to describe extensively hardware-specific features, and then the framework part of the system accesses those descriptions and converts them to ACPI. This Framework Plus Components architecture of an embodiment provides great reusability in the framework, and enables components to be added that include hardware-specific descriptions (e.g., AML).

Figure 7:
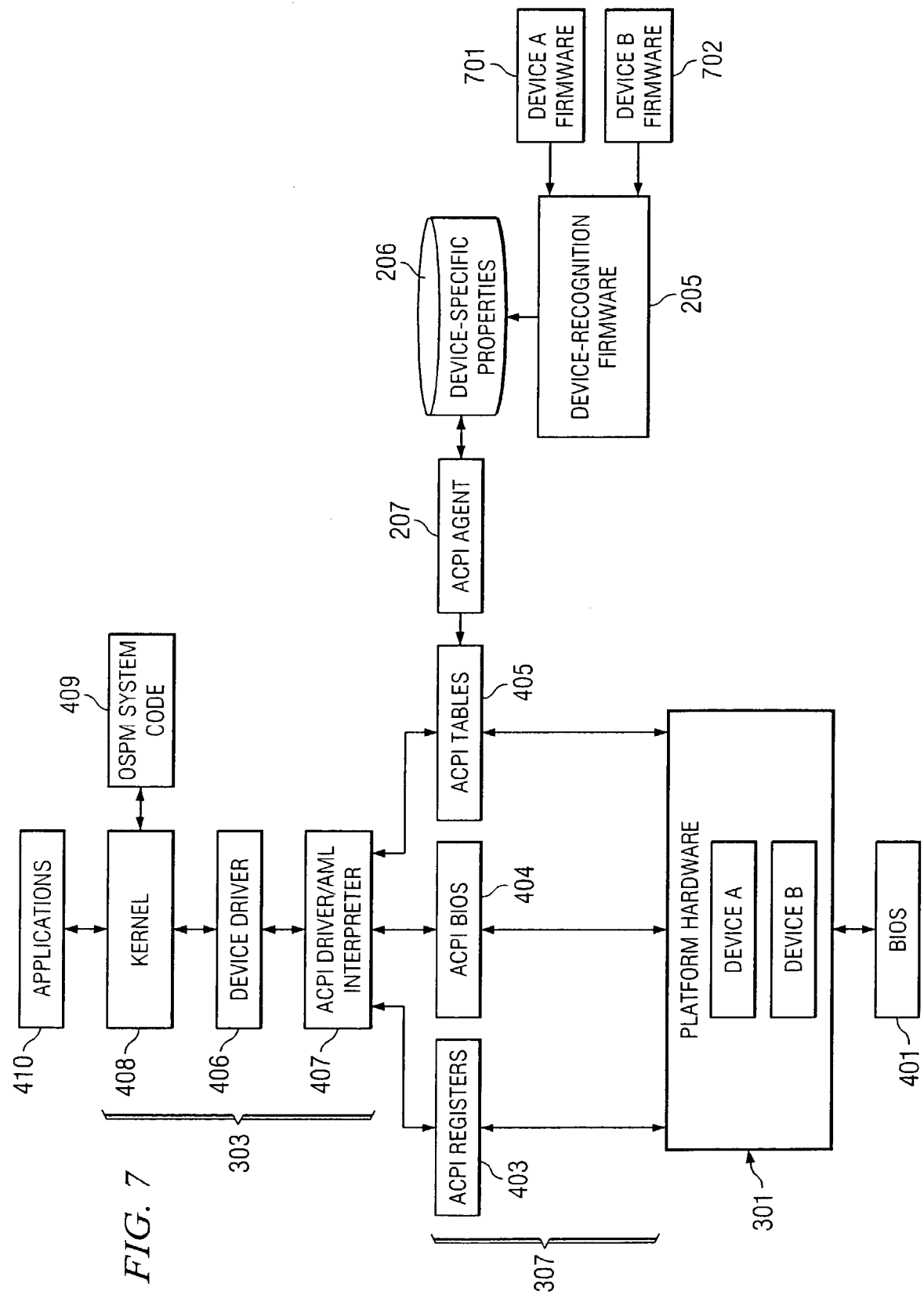
FIG. 7 shows an example block diagram of an embodiment of the present invention being implemented in the ACPI-compatible system of FIG. 4.

Referring to FIG. 7, it shows an example block diagram of an embodiment of the present invention being implemented in the ACPI-compatible system of FIG. 4. As shown, ACPI Agent 207, database 206, and device recognition firmware 205 are included in system firmware level 307. In this example, new hardware devices A and B are added within platform hardware 301. Additionally, firmware 701 associated with added device A and firmware 702 associated with added device B are included in firmware layer 307. Each device's associated firmware 701, 702 comprises the device-specific descriptors (e.g., AML code) for its respective hardware device. Device recognition firmware 205 retrieves the descriptors from the firmware 701, 702 and stores the device-specific descriptors (or "properties") to database 206. Thereafter, as described above, ACPI Agent 207 is operable to access database 206 and use the device-specific descriptors to generate the needed ACPI table entries for the added hardware devices A and B. For example, ACPI Agent 207 is operable to generate the needed AML code for each device based on the descriptors stored for each device in database 206, and store the AML code in the ACPI tables 405.

Figure 8:
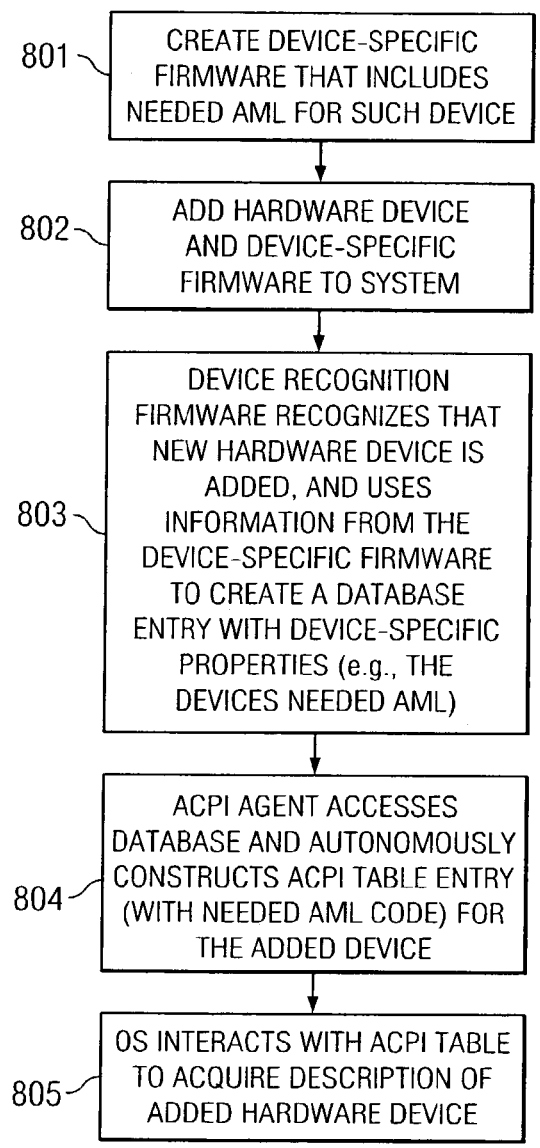
FIG. 8 shows an example operational flow diagram of implementing a new hardware device in a system in accordance with an embodiment of the present invention.

Referring to FIG. 8, it shows an example operational flow diagram of implementing a new hardware device in a system in accordance with an embodiment of the present invention. As shown, a developer creates device-specific firmware that may include any needed AML code for the hardware device to be added to a system, in operational block 801. For example, if the hardware device needs a real-time clock, the developer may include AML code in the device-specific firmware for implementing its real-time clock functionality. In operational block 802, the hardware device and device-specific firmware are added to the system. Then, in operational block 803, device recognition firmware recognizes that the new hardware device has been added to the system, and uses the information from the device-specific firmware (e.g., the device's descriptor, which may include AML code) to create a database entry with the device-specific properties.

In operational block 804, the ACPI Agent accesses the database and autonomously constructs an ACPI table entry (with any needed AML code) for the added hardware device. Then, in operational block 805, the OS interacts with the ACPI table to acquire the description of the added hardware device for managing such device.

FIGS. 9A-9B show example operational flow diagrams for a system autonomously generating the ACPI table entry (including any added AML code) for a newly added hardware device of the present invention. More specifically, FIG. 9A shows an example operational flow for a system during the boot-up process of the system and FIG. 9B shows an example operational flow for a system during its run-time.

FIG. 9A shows an example operational flow diagram 900 for an initial bootstrap of a computer system from power on. Dynamical AML generation is useful because, for example, a system may be implemented in a cellular system that comprises, for instance, 16 cells and up to 128 processors and 192 I/O cards. Accordingly, there may be 16 factorial (16!) different permutations (which totals over 20 trillion different permutations) for configuring the server hardware in such a cellular system. Other systems may be employed in such a cellular system to generate correct AML for all of the cells without knowing in advance which one of the different configurations the firmware is booting up into.

Operational block 902 is the initial state and represents the approximately simultaneous power-on transition of all hardware elements in the computer and the start of execution of the firmware. Each cell (of a multi-cell configuration) contains a copy of the same firmware and begins its initialization without knowledge (yet) of the other cells that will join it in forming what is referred to as a "partition." Thus, the operational blocks Initialize Framework 903 and Build Cell Tree 904 may be performed in parallel by each cell according to its own configured hardware. One cell is chosen as the root (sometimes called monarch) cell. The remaining cells become so-called slave cells and enter a wait state (not shown) until notified by the root cell (also not shown) prior to Launch OS Loader 913 to enter the OS Rendezvous state to wait for the command to join the running OS.

The cell chosen as the root cell enters Build Partition Tree 905, where a top-level device tree root is created and all of the device trees in each cell are grafted into the root. This creates the partition tree which holds all of the descriptive database for all the hardware currently configured into the partition. It is all of this hardware that is to be described in the ACPI tables to be generated. The foregoing sequence of steps is guided by the Sequencers 603 (of FIG. 6) and involves extensive collaboration among, primarily, Device Tree 605, Components 606, Platform Hardware 301, and Core Framework 602 elements of the example Banyan firmware system.

Sequencer 603 running alone in the root cell continues bootstrap and traverses the entire partition tree database 605 to locate each component represented in the tree that also exports a BuildAcpiObjects( ) service to build ACPI objects in step 906. For each that does have such a service, it is invoked. These functions create the per-device ACPI object entry lists (as described further in the example software methodologies described below) which is the precursor to actual AML generation. Object entry lists are stored in each component's 606 node in device tree 605.

Following generation of the ACPI object entry list properties in operational block 906, the various clients 609, 610, 611, and 612 of the Banyan Core 601 are, in the step Load Clients 907, loaded from ROM into main memory and their locations remembered.

Control is given by Sequencer 603 to ACPI Client 609, and this code performs the Generate Fixed Tables 908 step. Then, execution proceeds to PASS 1—Generate ACPI Paths 909, where device tree 605 is traversed and the ACPI namespace is developed in skeleton form. Each component 606 in device tree 605 that will become part of the ACPI namespace inside the OS is given a property that holds its ACPI name. These properties are used subsequently in the step Pass 2—Generate AML 910 to encode correct ACPI path references in AML that require it, such as operand 1 of the Notify opcode. The AML generated is placed into the ACPI XSDT table as either DSDT (for the ROO cell descriptions) or individual SSDTs for each of the individual non-root cells and all inferior (connected devices) elements belonging to that cell. Dynamic AML generation is complete at this step. The actual ACPI namespace is not created until much later (not shown) when the OS parses the ACPI tables and creates it.

Next, in step Initialize SAL Adapter 911, sequencer 603 launches the SAL Adapter client 611, which in turn launches the EFI ABI adapter 610 in step Initialize EFI Adapter 912. Finally, the EFI Adapter launches the Operating System Loader in step 913.

FIG. 9B shows an example sequence of control involving dynamic AML generation as part of adding a cell to a currently running system that had already booted sometime previously. Generally, a cell contains memory, processors, and optionally I/O hardware connections. All of these resources may need new AML code to be created to describe such resources to the running OS, and such new AML is to be loaded into the existing ACPI namespace that was constructed at boot-time from the ACPI tables provided using the boot-up flow of FIG. 9A.

FIG. 9B shows an example of operation of an embodiment of the present invention when new hardware, a cell, is added to a running computer with one or more cells already active and described in the ACPI namespace. Several steps of the AML generation in this example involve identical firmware to that of the boot-up operations of FIG. 9A, but they are coordinated differently. Looking ahead, for comparison, step 917 is equivalent to step 903; step 918 is equivalent to step 904; steps 921 and 924 are together similar to step 905; step 925 is similar to step 906; step 926 is similar to step 908 (except that only the new cell paths are generated as the existing cells already posses their path identities); step 927 is equivalent to step 910. Thus, certain solution steps (e.g., functional portions of firmware) are used in boot-time, as well as run-time generation of AML. Accordingly, this embodiment enables efficient reuse of such functional components for both boot-time and run-time implementations.

Intra-Cell 914 of FIG. 9B shows steps performed by processors inside of the cell before it becomes part of the partition. Intra-partition 915 of FIG. 9B shows steps performed by one or more processors that already belong to the running partition. It should be noted that until the hardware is programmed properly by firmware, processors in these two groups are unable to access resources of the other group. This fact is due to the so-called firewalls implemented in the chipset hardware of each cell that blocks access by non-member processors. This capability is the essential value of hard-partitions in these cellular, reconfigurable servers, such as the example cellular system being described in conjunction with FIGS. 9A-9B.

Add Cell 916 represents either physically installing and powering on, or simply powering on a free cell after having configured it (by manipulating non-volatile global database owned by the manageability processor) as an 'intended' new member of an existing partition. This causes the cell to begin booting to become part of the new partition. Similar to step 903, Initialize Framework 917 proceeds to discover and initialize processors, memory, and I/O resources belonging to (within or connected to) the cell. Step Build Cell tree 918 builds the cell-local device tree of firmware components and programs the cell's partition map to enable access by processors within the partition to which the cell is joining. At this point, Announce Readiness 919, the Sequencer 603, which is guiding these steps, informs the manageability subsystem which is 'outside' of the partition(s) that is ready to join the partition. The cell then enters Wait 920 until it is notified to join.

Arrow 934 indicates the event is signaled by the manageability subsystem to the active partition. This event is handled 922 by the OS, and passed to AML firmware in the ACPI namespace. This firmware arranges to activate core firmware 923, which is necessitated by the hardware design and limitations of AML.

Graft Cell to Partition 924 is performed by collaboration between a processor executing core firmware 923 inside the partition and the control (monarch) processor executing Join Partition 921. This collaborative process is modeled by the arrow 935. Following this step, the cell is inside the partition and the processors available to the OS but the OS does not yet know about the new hardware. The remainder of the sequence generates the AML that will describe this new hardware and makes this AML available to the OS.

Now that the cell is part of the partition tree, the step Build Cell ACPI Objects 925 can be invoked. This step is similar to that represented by 906, except that only one cell (the new cell) has its objects built by traversal of each component in the cell's local device tree and invoking the BuildAcpiObjects( ) method found on that component. Following this step, the core firmware invokes a special entry of the ACPI Client 609, whereby the AML of a single cell is created. This begins with Generate ACPI Paths 926 (pass 1) and follows with Generate AML 927 (pass 2).

The new SSDT is built and a pointer to this new AML table is placed into (Insert SSDT into XSDT 928) the existing XSDT that was used at boot-time. To achieve this reuse of the XSDT, the ACPI tables are not reclaimed by the OS. Firmware ensures this through describing the memory containing these tables as EfiACPIMemoryNVS which is the architected method to support the LoadTable( ) opcode as described in the ACPI and EFI standards. Part of step 928 includes finding a free entry and recalculating the length and checksum fields of the XSDT header so when the OS subsequently reparses (searches) the XSDT (step 931), no error occurs.

Just before returning control of the processor entered core firmware to the OS, firmware asserts the LoadTable GPE 929, which causes specific AML methods to subsequently execute in Handle GPE 930. One of these methods invokes the LoadTable( ) opcode passing to it information retained in step 922 earlier, that allows the OS to search the XSDT for the new table and ignore the other tables still there. If the table is loaded, all of the new AML becomes part of the existing ACPI namespace (is grafted into it, similar to the way the core firmware grafted the device trees together in step 924). The last step of the AML firmware that invoked LoadTable( ) is to invoke a Notify( ) opcode 932 to alert the OS that new resources are present in the namespace and they should be enumerated and claimed by the OS and made available to applications 933. Example Software Methodologies Used in Implementing An Embodiment Certain software methodologies used in implementing one embodiment of this invention are now described. These details are software design and the notation and descriptions employed are familiar to software developers who write firmware.

The Object Descriptor Element

The ACPI object descriptor element lists used by ACPI Agent 609 to generate AML are a list of data structures containing a description of the AML objects to be generated. The data structure for each element in the list has the following format:

```
typedef struct {
uint8 name[4]
uint8 type;
uint8 dtype;
union {
  uint64 data[3]
  uint8    string[24];
  } u;
acpi_object_entry_t;
```

The name field is used to provide the ACPI object name for those AML objects that require one (such as Device, Method, Name, etc.).

The type field is used to define the AML object type being described (such as Device, Name, Method, etc.).

The dtype field is used to define the data type, fi any, associated with the AML object (such as BYTE, WORD, DWORD, etc.). Not all objects will have associated data.

The data union field is used to pass in any associated data objects. How this union is used is determined by the object type, but some general conventions are used:

u.data[0] is used to pass data values, node pointers, and buffer pointers;

u.data[1] is used to pass method flags;

u.data[2] is used to pass element counts, buffer lengths, or argument counts; and u.string is used for string values.

ACPI Element Object Flags

The flags field of the object descriptor element is used to specify flags which may be used to modify the AML generation. The following flags are supported. (These are #define manifest constants in the C language source).

ACPI_OBJECT_$_{BUILD}$_MASK

The least significant 6 bits of the flags field are used to designate an ACPI build mask bit for the object. If the designated bit (0-63) in the ACPI build mask specified by this field is not set, the object will be skipped by the ACPI Agent, and no AML controlled by this object is emitted. For Scope( ), Device( ), Processor( ), and Method( ) objects, causing the object to be ignored will result in all objects contained within the scope of that object to also be ignored. If this field is 0, the object will not be affected by the ACPI build mask and will generate AML according to the object contents (which may be null). The ACPI build mask may be controlled by an expert user with the DUI acpi_dbg command early in the boot process.

The following build mask selections are currently supported:

TABLE 1

ACPI Table Generation Control Flag Names

| Mask Bit Identifier (in source code) | Functional Purpose (what it controls) |
|---|---|
| ACPI_MASK_BIT_DIMM | DIMM devices (_HID = HWP1000) |
| ACPI_MASK_BIT_PROC | Processor devices |
| ACPI_MASK_BIT_LOCAL_MEM | Memory devices (_HID-PNP9C80) |
| ACPI_MASK_BIT_SBA | System bus Adapter (_HID-HWP0005) |
| ACPI_MASK_BIT_LBA | Local Bus Adapter (_HID-HWP0002) |
| ACPI_MASK_BIT_GPE | GPE Devices (_HID-"ACPI0006") |
| ACIP_MASK_BIT_MADT | _MAT methods |
| ACPI_MASK_BIT_CCIOSAPIC | IOSAPIC resource in CC device |
| ACPI_MASK_BIT_CC | CC Device (_HID = HWP0006) |
| ACPI_MASK_BIT_CELL | Module Device (_HID = "ACPI0004") |
| ACPI_MASK_BIT_CRS | _CRS Methods |
| ACPI_MASK_BIT_PRT | _PRT Methods |
| ACPI_MASK_BIT_PXM | _PXM Methods |
| ACPI_MASK_BIT_PCI | PCI Slot Devices (i.e., SxFy) |
| ACPI_MASK_BIT_SLIT | Static SLIT table |
| ACPI_MASK_BIT_SRAT | Static SRAT table (Microsoft) |
| ACPI_MASK_BIT_CPEP | Static CPEP table |
| ACPI_MASK_BIT_HCDP | Static HCDP table |
| ACPI_MASK_BIT_SPCR | Static SPCR table |
| ACPI_MASK_BIT_DBGP | Static DBGP table (Microsoft) |
| ACPI_MASK_BIT_NONCORE_SAPICS | SAPIC descriptors of non-core cells |
| ACPI_MASK_BIT_PD_MEM | Interleaved Memory Devices |
| ACPI_MASK_BIT_SPMI | Service Processor Device table |
| ACPI_MASK_BIT_SPMI_DEVICE | SPMI device (_HID = IPI0001) |
| ACPI_MASK_BIT_IOC | IOC Devices (_HID = HWP004) |
| ACPI_MASK_BIT_GSP | Static GSP (superdome debugger) table |
| ACPI_MASK_BIT_MEMSIZE | DIMM device DSIZ methods |
| ACPI_MASK_BIT_HOTPLUG | Certain Hot-Plug methods |
| ACPI_MASK_BIT_OPREGION | Operation Regions |
| ACPI_MASK_BIT_AML | Static AML (from .asl) inclusion |
| ACPI_MASK_BIT_VENDOR | Vendor-Specific methods |
| ACPI_MASK_BIT_HPET | Static HPET table |

TABLE 1-continued

ACPI Table Generation Control Flag Names

| Mask Bit Identifier (in source code) | Functional Purpose (what it controls) |
|---|---|
| ACPI_MASK_BIT_HPET_DEVICE | Multimedia Timer (_HID-PNP0103) |
| ACPI_MASK_BIT_UART_DEVICE | UART Devices (_HID = PNP0501) |
| ACPI_MASK_BIT_MULTI_SEG | Multiple PCI Segments |
| ACPI_MASK_BIT_SBCT | SBCT table |
| ACPI_MASK_BIT_PCIBRIDGE | P2P Bridge devices (_HID = PNP) |
| ACPI_MASK_BIT_SRAT_INTLV | Include Interleaved RAM in SRAT |
| ACPI_MASK_BIT_2_0_ENABLE | Override to enable group of flag bits |
| ACPI_MASK_BIT_DEBUG | Selectable prints during AML generation |

ACPI_OBJECT_FLAG_NONCORE

This flag, if set, will indicate that the object should be processed only for non-core cells. For the core cell, the object will be ignored.

ACPI_OBJECT_FLAG_CORE

This flag, if set, will indicate that the object should be processed only for the core cell. For non-core cells, the object will be ignored.

ACPI_OBJECT_FLAG_END

This flag, if set, indicates that this object element is the last element in the current scope (Scope( ), Processor( ), or Method( )). This flag may be used in place of a specific END object to close a scope.

ACPI_OBJECT_FLAG_EXTENSION

This flag, if set, indicates that extension object(s) are included. The extension objects are used to specify data elements for some object types.

ACPI Element Data Types

For ACPI objects that include or describe a data object, the type of data object to be generated is specified by the dtype parameter. The actual data, or a pointer to the data, is passed in the data union. In addition to the data type field, there are two data modifier flags that may be used in conjunction with the data type:

(1) ACPI_DATA_TYPE_EXTERN: may be used to specify that the data is actually stored in a global property on the component node rather than directly in the object. In this case, the data field of the object will contain an ASCII string (up to 23 bytes in length) specifying the global property in which the actual data is stored. The format of the stored data is specified by the data type field.

(2) ACPI_DATA_TYPE_UNICODE: may be used in conjunction with the string data types to indicate that the passed in ASCII string should be converted to UNICODE before being stored in the descriptor table.

The following data types are currently supported by ACPI Agent 609.

ACPI_DATA_TYPE_NONE

Indicates that there is no data object associated with this element.

ACPI_DATA_TYPE_BYTE

A byte data object will be generated. An 8-bit data value is contained in the DATA[0] field.

ACPI_DATA_TYPE_WORD

A word data object will be generated. A 16-bit data value is contained in the data[0] field.

ACPI_DATA_TYPE_DWORD a dword data object will be generated. A 32-bit data value is contained in the data[0] field.

ACPI_DATA_TYPE_QWORD

A qword data object will be generated. A 64-bit data value is contained in the data[0] field.

ACPI_DATA_TYPE_STRING

A string data object will be generated. A short (<24 bytes) string is contained in the string field. If the ACPI_DATA_TYPE_UNICODE modifier flag is used in conjunction with this data type, the ASCII string will be converted to a Unicode string before being stored in the descriptor table. In this case, a buffer object is generated containing the Unicode string.

ACPI_DATA_TYPE_LONG_STRING

A string data object will be generated. A long (>=24 bytes) string is contained in a buffer whose pointer is stored in the data[0] field and the length in the data[2] field. If, however, the ACPI_DATA_TYPE_EXTERN flag is set for this data type, the string field will contain the global property on the component node in which the actual string is stored. The ACPI agent will read in the target property and store the buffer point and length fields in the object before processing it. If the ACPI_DATA_TYPE_UNICODE modifier flag is included, the ASCII string will be converted to a Unicode string before being stored in the descriptor table. In this case, a buffer ACPI object is generated.

ACPI_DATA_TYPE_PACKAGE

A package data object will be generated. The list of elements to include in the package may be specified in one of three ways:

(1) If the ACPI_OBJECT_FLAG_EXTENSION flag is set, and the ACPI_DATA_TYPE_EXTERN flag is not set, then the package elements are contained in the list of object descriptors following this one. The data[2] field contains the number of elements in the package. See the ACPI_OBJECT_TYPE_EXTENSION description.

(2) If the ACPI_OBJECT_FLAG_EXTENSION flag is not set, and the ACPI_DATA_TYPE_EXTERN flag is not set, then the data[0] field contains a pointer to a buffer in which the object descriptor list containing the elements is contained. The data[2] field contains the number of elements to include in the package.

(3) If the ACPI_DATA_TYPE_EXTERN flag is set, the string field will contain the global property name on the component node in which the element object descriptor list is contained. In this case, the ACPI agent will read the element list from the property and store a pointer to the buffer and the element count in the object before processing it.

The package element list is stored as a list of ACPI element structures. Each object in the element list has a type of ACPI_OBJECT_TYPE_EXTENSION, and all but the final object in the element list has the ACPI_OBJECT_FLAG_EXTENSION flag set. ACPI_DATA_TYPE_BUFFER A Buffer( ) object is generated. The binary data to include in the object is pointed to by the data[0] field, and the length of the buffer is contained in the data[2] field. If the ACPI_DATA_TYPE_EXTERN flag is set for this data type, the string field will contain the global property name on the component node in which the actual buffer data is stored. The ACPI agent will read in the target property and store the buffer pointer and buffer length in the object before processing it.

ACPI_DATA_TYPE_NODE

This data type specifies that a device tree node pointer is contained in the data[0] field. How the pointer is processed is dependent on the object type.

ACPI_DATA_TYPE_LOCALOP

An AML local variable opcode is generated, typically as the target (2nd) operand of a Store( ) opcode generated with an ACPI_OBJECT_TYPE_STORE element. The data[0] field contains the specified {0 . . . 7} for the selected Opcode, (Local0, . . . , Local7, respectively).

ACPI_DATA_TYPE_NAMESEG

A multi-segment name object is generated. A pointer to the buffer containing the concatenated name segments is contained in the data[0] field, and the name segment count is contained in the data[2] field. The name segments are each 4 bytes in length. If the ACPI_DATA_TYPE_EXTERN flag is set for this data type, the string field will contain the global property name on the component node in which the actual name segment data is stored. The ACPI agent will read in the target property and store the name segment pointer and segment count in the object before processing it.

ACPI_DATA_TYPE_ROOTED_PATH

A complete ACPI device/object path, rooted at \, will be generated. The Banyan device node handle whose ACPI path is to be generated is contained in the data[0] field. The ACPI device path of a Banyan node is generated in the first pass of the ACPI client descriptor table generation, and is stored on that node's property list as a property named ACPI_PATH_PROPERTY, and then data[0] and data[2] fields are updated to hold the address of this property and the number of path segments. In the second pass, when the AML is generated, the object is processed just like the ACPI_DATA_TYPE_NAMESEG. The ACPI agent will add the path separator character when it builds the path object.

ACPI_DATA_TYPE_LITERAL

Causes one literal byte converted from data[0] to be generated into the AML byte stream. Has been sued in very limited ways, (to generate Ones and Zero) and may become obsolete by smarter objects.

ACPI_DATA_TYPE_ZERO

Causes the ACPI agent to generate a 0x 00 into the AML bytestream.

ACPI_DATA-TYPE_LOCATION

This is a specific high-level object designed solely for generating the _STR objects, which are Buffer objects whose contents are Unicode-encoded strings that represent a device description.

Acpi Element Object Types

The type field of the ACPI object element structure defines the type of ACPI AML object to be generated. The ACPI agent currently supports the following ACPI object types.

ACPI_OBJECT_TYPE_NONE

This object type will cause the object entry to be skipped.

ACPI_OBJECT_TYPE_NAME

A Name( ) object will be generated. The name field contains the 4-character ACPI name. The dtype field specifies the associated data object (if any) which will be generated.

ACPI_OBJECT_TYPE_OPREGION

An OpRegion( ) object will be generated. The name field contains the 4-character OpRegion name. The OpRegion type, using ACPI encoding, is contained in the data[0] field, the OpRegion offset in the data[1] field, and the OpRegion length in the data[2] field. The offset and length fields will be generated as quad-word AML objects.

ACPI_OBJECT_TYPE_METHOD

A simple Method( ) object of the form:

Method(name) { Return(data object)
} will be generated. The name field contains the 4-character method name. The data object to be returned is specified by the dtype field. The data[1] field contains the method flags. Note that if the ACIP_DATA_TYPE_EXTERN flag is set in the dtype field, then the string field will contain a property string and thus it is not possible to specify the method flags. In this case, the method flags will default to 9. If it is necessary to set specific method flags, then the ACPI_DATA_TYPE_EXTERN flag should not be used or the ACPI_OBJECT_TYPE_METHOD_SCOPE type should be used.

ACPI_OBJECT_TYPE_NOTIFY

Part of a Notify command of the form:

Notify(<path>, <cmd>) will be generated.

The dtype field should contain ACPI_DATA_TYPE_ROOTED_PATH, and data[0] should contain the node handle of the device tree node that corresponds to the ACPI namespace node that is the scope of the notify operation.

The <cmd> argument must be supplied in an extension object so the flags field should have ACPI_OBJECT_FLAG_EXTENSION set and another ACPI object should follow immediately containing the data type ACPI_OBJECT_TYPE_EXTENSION, with an appropriate ACPI data object that encodes the integer value of the command number. Typically, a Notify object will also have the ACPI_MASK_BIT_HOTPLUG value set in the flags field, to indicate this is an object to be controlled by that ACPI agent flag.

ACPI_OBJECT_TYPE_RESOURCE

A Name(_CRS) object will be generated. The name field should contain "_CRS". The dtype field should contain ACPI_DATA_TYPE_BUFFER. If the ACPI_DATA_TYPE_EXTERN modifier flat is set, the string field will contain the global property name on the component node in which the resource buffer is contained. Otherwise, data[0] will contain a pointer to the resource buffer and data[2] the resource buffer length. The specified data buffer should contain the ACPI resource data excluding an END resource element. The END resource element will be appended to the descriptor and the checksum for the buffer generated.

ACPI_OBJECT_TYPE_PRT

A Method(_PRT) object will be generated. The name field should contain "_PRT". The dtype field should contain ACPI_DATA_TYPE_BUFFER. If the ACPI_DATA_TYPE_EXTERN flag is set, the string field will contain the global property name on the component node in which the PCI route table information is contained. Otherwise, data[0] will contain the buffer length. The PCI route data is specified by a table of entries, each with the following format:

```
typedef struct {
    uint16      unit;
    uint8       slot;
    uint8       device;
```

```
            uint8      pin;
            uint32     gsi;
        } pci_route_entry_t;
```

The unit parameter is used internally to group PCI bus entries, and is not used by the ACPI agent. The slot, device, pin, and gsi parameters are used by the ACPI agent to build the PCI route table package elements. A route package will be generated for each element in the list.

ACPI_OBJECT_TYPE_AML

A block of static AML code (generated by the ASL compiler) will be inserted into the ACPI descriptor table. The dtype field should contain ACPI_DATA_TYPE_BUFFER. If the ACPI_DATA_TYPE_EXTERN flag is set, the string field will contain the global property name on the component node in which the AML code is contained. Otherwise, the data[0] field will contain a pointer to the buffer containing the AML code, and data[2] will contain the buffer length. The static AML buffer will be read in, the checksum and header information verified, the header stripped off, and the data inserted directly into the descriptor table.

ACPI_OBJECT_TYPE_DEVICE

A Device( ) object will be generated. The device name is contained in the name field. This object opens a Device scope: all objects which follow, up to the end of the current element list or until an ACPI_OBJECT_TYPE_END object or ACPI_OBJECT_FLAG_END flag is encountered, will be contained within the device scope.

ACPI_OBJECT_TYPE_PROCESSOR

A Processor( ) object will be generated. The processor device name is contained in the name field. This object opens a Processor scope: all objects which follow, up to the end of the current element list or until an ACPI_OBJECT_TYPE_END object or the ACPI_OBJECT_FLAG_END flag is encountered, will be contained within the processor scope. The data[0] field contains the processor ID parameter, the data[1] field contains the block address parameter, and the data[2] field contains the block length parameter.

ACPI_OBJECT_TYPE_INCLUDE

This object will include and process an ACPI element list from another source. If the dtype field contains ACPI_DATA_TYPE_STRING, the object list will be read from the global property specified by the string on the current component node. If the dtype field contains ACPI_DATA_TYPE_NODE, the object list will be read from the ACPI_OBJECT_PROPERTY global property on the node specified in the data[0] field. If the dtype field contains ACPI_DATA_TYPE_BUFFER, the object list will be read from the buffer specified in the data[1] field, with a length specified in the data[2] field.

ACPI_OBJECT_TYPE_SCOPE

A Scope( ) object will be generated. All objects which follow, up to the end of the current element list or until an ACPI_OBJECT_TYPE_END object or ACPI_OBJECT_FLAG_END flag is encountered, will be contained within the specified scope. If the dtype field contains ACPI_DATA_TYPE_STRING, a single 4 character element scope name is contained in the string field. If the dtype field contains ACPI_DATA_TYPE_NAMESEG, the data[0] field contains a pointer to a buffer containing the concatenated name segments, and the data[2] field contains the segment county. The ACPI agent will generate the name segment separator character when it builds the path.

ACPI_OBJECT_TYPE_CALL

A method call will be generated. The name field contains the 4-character method to be called. If the dtype parameter contains ACPI_DATA_TYPE_PATH, the data[0] field contains the component node from which the ACPI device path will be read. The device path is stored in a global property on the target node, and is generated in the first pass of the ACPI agent descriptor table processing. If the dtype parameter contains ACPI_DATA_TYPE_BUFFER, the data[0] field contains a pointer to the buffer in which the concatenated ACPI device path segments are contained, and the data[2] field contains the segment count. If the ACPI_OBJECT_FLAG_EXTENSION flag is set, the arguments which will be passed to the called method follow this object. In this case, the list of argument objects should each have a type of ACPI_OBJECT_TYPE_EXTENSION, and all but the final argument object in the list should have the ACPI_OBJECT_FLAG_EXTENSION flag set.

ACPI_OBJECT_TYPE_METHOD_SCOPE

Opens a Method( ) scope. The name field contains the 4 character method name. All objects which follow, up to the end of the current object list or until an ACPI_OBJECT_TYPE_END object or ACPI_OBJECT_FLAG_END flag is encountered, will be contained within the method scope. The data[1] field contains the method flags.

ACPI_OBJECT_TYPE_EXTENSION

This object type is used to designate an extension to a previous object, and is used primarily for defining arguments for method calls. The dtype field specifies the type of data object to be generated. If there are multiple extension objects in the list, the ACPI_OBJECT_FLAG_EXTENSION flag should beset for all but the final object in the list.

ACPI_OBJECT_TYPE_RETURN

Generate a Return( ) object. The dtype field specifies the type of data object to be returned.

ACPI_OBJECT_TYPE_END

Signifies the end of the current scope (SCOPE( ), Processor( ), or Method( )). If the ACPI_OBJECT_FLAG_END flag is set in any object, it will have the same effect as including a specific end object. Similarly, the end of the current object list will close the current scope.

A Simple Example, the PCI Slot Devices: As previously mentioned, the mechanisms to dynamically generate AML in one embodiment are used at boot time, to create namespace for hardware resources and devices discovered at boot time and also at runtime when the namespace resources must grow. This simple example of the PCI slot devices does not use AML resource descriptors (i.e., _CRS objects) to be generated but AML that defines namespace containing functional methods is used.

The same basic pattern for AML generation used here in this simple example is also employed in the much more complex scenario of adding processors, memory and I/O devices to the namespace. The main difference is that the AML and the namespace is more complex (more properties, more AML, more complex objects, etc.)

The ACPI object element lists constructed by each component are linked together to generate a complete list to pass to the ACPI agent descriptor list parser. The ACPI agent processes the list from each cell node into the appropriate descriptor table: the core cell list is used to generate the DSDT, and each non-core cell will be generated into a separate list. Each PCI slot supported by a PCI bus adapter has an associated PCI device element list to describe the slot/function PCI device objects. The PCI device element lists are generated by the pci component and stored on the pci device nodes. These lists are included by the parent LBA device which enables control the PCI bus. Each PCI device list contains the following elements for each of eight PCI functions.

Device element: opens the slot/function device scope. Names are generated of the form "SxFy", where x is the Slot number, and is 0 in Superdome systems, and y is one of {0, 1, 2, 3, 4, 5, 6, 7} representing each of the 8 functions of the PCI slot.

_ADR element: defines the _ADR name object

_UID element: defines the _UID name object

_SUN element: defines the _SUN name object

_STR element: defines the _STR name object

Static AML include element: includes the static AML code (see below), that supplies definitions for six methods:

_STA method to return device status—ACPI standard

_EJO method to eject the device—ACPI standard

ATN1 method to lite the slot attention LED—non-standard

ATNF method to flash the slot attention LED

ATN0 to unlite the slot's attention LED

ASTA to return the current state of the slot's attention LED.

Each of these methods actually invoke AML methods of the SxFy device parent, the LBA device, where the actual work of dereferencing the Operation Region registers to perform the operation.

Example source code excerpts defining these objects is listed below:

This definition creates a byte array of AML that is included by the fun[*].aml objects whose object type is ACPI_OBJECT_TYPE_AML. The actual code that produced this .h data file is:

```
DefinitionBlock(
    "pci method.aml",      // Output filename
    "SSDT",                // Signature
    2,                     // SSDT Revision
    "HP",                  // OEMID
    "Granite",             // Table ID
    0x0000                 // OEM Revision
)
{   // Start of definition block
    // These methods are defined in the parent Local Bus Adapter device
    // and it is there that the actual work is done. Because each
    // of the 8 Slot/Function devices have identical AML for these
    // methods, we use static AML for them.
    External (^^SSTA, MethodObj)
    External (^^_EJ0, MethodObj)
    External (^^ASTA, MethodObj)
    External(^^ATN0, MethodObj)
    External (^^ATN1, MethodObj)
    External (^^ATNF, MethodObj)
    // _EJ0 - Eject Method invokes parent LBA_EJ0 method
    Method(_EJ0, 1) { Return(^^_EJ0(Arg0))} // End of_EJ0
    // _STA - Status Method invokes parent LBA SSTA method
    Method (_STA) { Return (^^SSTA( ))} // End of_STA
    // ASTA - Return Attention LED Status (off, on, flashing)
    Method (ASTA) {Return (^^ATNA( ))}
    // ATNO - Set Attention LED OFF by called LBA method
    Method (ATNO) { Return (^^ATNO ( )) }
    // ATN1 - Set Attention LED ON by calling LBA method
    Method(ATN1) { Return(^^ATN1( )) }
    // ATNF - Set Attention LED Flashing by calling LBA method
    Method (ATNF) { Return (^^ATNF( )) }
} // End of DefinitionBlock( )
```

```
static uint8 pci_aml_data[ ] = {
#include "pci_method.h"
};   /* the data definition file generated by the ASL compiler */
The pci_method.h file contains:
/*
*
* Intel ACPI Component Architecture ASL Compiler X2039 [May 29 2002]
* Includes ACPI CA Subsystem version 20020308
* Copyright (C) 2000-2002 Intel Corporation
* Supports ACPI Specification Revision 2.0
*
* Compilation of "pci_method.asl" - Sat Oct 26 13:39:33 2002
*
* C source code output
*
*/
    0x53, 0x53, 0x44, 0x54, 0x79, 0x00, 0x00, 0x00, /*  00000000    "SSDTy..."  */
    0x02, 0x33, 0x48, 0x50, 0x00, 0x00, 0x00, 0x00, /*  00000008    ".3HP...."  */
    0x47, 0x72, 0x61, 0x6E, 0x69, 0x74, 0x65, 0x00, /*  00000010    "Granite."  */
    0x00, 0x00, 0x00, 0x00, 0x49, 0x4E, 0x54, 0x4C, /*  00000018    ".... INT*/
    0x39, 0x20, 0x00, 0x02, 0x14, 0x0E, 0x5F, 0x45, /*  00000020    "9....._E"  */
    0x4A, 0x30, 0x01, 0xA4, 0x5E, 0x5E, 0x5F, 0x45,/*   00000028    "J0..^^_E"  */
    0x4A, 0x30, 0x68, 0x14, 0x0D, 0x5F, 0x53, 0x54,/*   00000030    "J0h.._ST"  */
    0x41, 0x00, 0xA4, 0x5E, 0x5E, 0x53, 0x53, 0x54,/*   00000038    "A..^^SST"  */
    0x41, 0x14, 0x0D, 0x41, 0x53, 0x54, 0x41, 0x00,/*   00000040    "A...ASTA."  */
    0xA4, 0x5E, 0x5E, 0x41, 0x53, 0x54, 0x41, 0x14,/*   00000048    "^^ASTA."  */
    0x0D, 0x41, 0x54, 0x4E, 0x30, 0x00, 0xA4, 0x5E,/*   00000050    ".ATN0..^"  */
    0x5E, 0x41, 0x54, 0x4E, 0x30, 0x14, 0x0D, 0x41,/*   00000058    "^ATN0..A"  */
    0x54, 0x4E, 0x31, 0x00, 0xA4, 0x5E, 0x5E, 0x41,/*   00000060    "TN1..^^A"  */
    0x54, 0x4E, 0x31, 0x14, 0x0D, 0x41, 0x54, 0x4E,/*   00000068    "TN1..ATN"  */
    0x46, 0x00, 0xA4, 0x5E, 0x5E, 0x41, 0x54, 0x4E,/*   00000070    "F..^^ATN"  */
    0x46,
```

As can be seen, the statically generated AML is quite simple and contains no device specific knowledge.

The dynamic AML ACPI objects for the PCI function devices is defined in the source as follows:

```
typedef struct pci_slot_object {
    struct pci_function_object {
        acpi_object_entry_t    dev;   /* device scope */
        acpi_object_entry_t    adr;   /* _ADR */
        acpi_object_entry_t    uid;   /* _UID */
        acpi_object_entry_t    sun;   /* _SUN */
        acpi_object_entry_t    str;   /* _STR */
        acpi_object_entry_t    aml;   /* include static AML */
```

```
        acpi_object_entry_t    end;   /*end device scope */
    }                          fun[8];
} pci_slot_object_t;
```

The following code initializes each of these SxFy ACPI objects dynamically at runtime. The key runtime data values obtained from the accessing the device tree properties related to this PCI device, are:
  rp→slot which identifies what we call the 'rope' number,
  slotIndex which is the number of slots per rope and equal to 1 in this system
  infoPtr which is the PCI device state variable structure holding the context of this component's data in the device tree.

```
/* allocate the memory for the objects */
sp = (pci_slot_object_t *) malloc (slotIndex * sizeof (pci_slot_object_t));
for (funcIndex = 0; funcIndex <= PCI_PFA_FUNC_NUM_MAX; funcIndex++){
    /* Device( ) */
    sprintf (name, "S%1XF%1X", rp->slot, (uint8) funcIndex);
    strncpy (sp [slotIndex].fun[funcIndex].dev.name, name, 4);
    sp[slotIndex].fun[funcIndex].dev.type = ACPI_OBJECT_TYPE_DEVICE;
    sp[slotIndex].fun[funcIndex].dev.dtype = ACPI_DATA_TYPE_NONE;
    sp[slotIndex].fun[funcIndex].dev.flags = ACPI_MASK_BIT_PCI;
    /* _ADR( ) */
    strncpy(sp[slotIndex].fun[funcIndex].adr.name, "_ADR", 4);
    sp[slotIndex].fun[funcIndex].adr.type = ACPI_OBJECT_TYPE_NAME;
    sp[slotIndex].fun[funcIndex].adr.dtype = ACPI_DATA_TYPE_DWORD;
    sp[slotIndex].fun[funcIndex].adr.flags = ACPI_MASK_BIT_ADR;
    sp[slotIndex].fun[funcIndex].adr.ACPI_OBJ_DATA =
            (rp->device << 16) | funcIndex;
    /* _UID */
    Strncpy (sp[slotIndex].fun[funcIndex].uid.name, "_UID", 4);
    sp[slotIndex].fun[funcIndex].uid.type = ACPI_OBJECT_TYPE_NAME;
    sp[slotIndex].fun[funcIndex].uid.dtype = ACPI_DATA_TYPE_BYTE;
    sp[slotIndex].fun[funcIndex].uid.flags = ACPI_MASK_BIT_UID;
    sp[slotIndex].fun[funcIndex].uid.ACPI_OBJ_DATA =
    (         rp->slot <<4) | (funcIndex $ 0xf);
    /* _SUN */
    strncpy (sp[slotIndex].fun[funcIndex].sun.name, "_SUN", 4);
    sp[slotIndex].fun[funcIndex].sun.type = ACPI_OBJECT_TYPE_NAME;
    sp[slotIndex].fun[funcIndex].sun.dtype = ACPI_DATA_TYPE_BYTE;
    sp[slotIndex].fun[funcIndex].sun.flags = ACPI_MASK_BIT_SUN;
    sp[slotIndex].fun[funcIndex].sun.ACPI_OBJ_DATA = rp->slot;
    /* _STR - Physical Location Unicode String */
    strncpy (sp[slotIndex].sun.name, "_STR", 4);
    sp[slotIndex].fun[funcIndex].sun.type = ACPI_OBJECT_TYPE_NAME;
    sp[slotIndex].fun[funcIndex].sun.dtype = ACPI_DATA_TYPE_LOCATION;
    sp[slotIndex].fun[funcIndex].sun.flags = ACPI_MASK_BIT_STR;
    sp[slotIndex].fun[funcIndex].sun.data [0] = CreateLocation(infoPtr);
    sp[slotIndex].fun[funcIndex].sun. data [1] = 0;
    sp[slotIndex].fun[funcIndex].sun.data [2] = 0;
    /* include AML */
    sp[slotIndex].fun[funcIndex].aml.type = ACPI_OBJECT_TYPE_AML;
    sp[slotIndex].fun[funcIndex].aml.dtype = ACPI_DATA_TYPE_BUFFER;
    sp[slotIndex].fun[funcIndex].aml.flags = ACPI_MASK_BIT_EJ0;
    sp[slotIndex].fun[funcIndex].aml.ACPI_OBJ_DATA = (uint64) & pci_aml_data;
    sp[slotIndex].fun[funcIndex].aml.ACPI_OBJ_LENGth = sizeof (pci_aml_data);
    /* END */
    sp[slotIndex].fun[funcIndex].end.type = ACPI_OBJECT_TYPE_END;
    sp[slotIndex].fun[funcIndex].end.dtype = ACPI_DATA_TYPE_NONE;
    sp[slotIndex].fun[funcIndex].end.flags = ACPI_MASK_BIT_PCI;
}
```

PCI Slot device properties are listed as they are displayed by the DUI command interface. The key is one LbaNode which is used to obtain the two PCI-device-dependent runtime variables used above.

| Name | pci008000 | |
|---|---|---|
| Type | pci | |
| LbaNode | 0x80000ffc0040ec10 | |
| PciBus | 0x00 | |
| PciBusRange | 0x0000000000000010 | |
| PciSegment | 0x0000000000000008 | |
| ACPI_Objects | | |
| 0x00000000: | 0x00000811000000000 | 0x000008003f8d6110 |
| 0x00000010: | 0x0000000000000000 | 0x0000000000000700 |

As described above, the ACPI agent processes the list of acpi_object_entry_t descriptors and converts it to binary AML that is part of a DDB (in either the DSDT or one of the SSDTs).

The invention claimed is:

1. An Advanced Configuration and Power Management Interface (ACPI)-compatible system comprising:
   database for storing a device-specific descriptor for a hardware device; and
   ACPI agent operable to autonomously construct an ACPI table entry for said hardware device using said device-specific descriptor.

2. The ACPI-compatible system of claim 1 wherein said ACPI agent is operable to autonomously construct ACPI Machine Language (AML) code that is included in said ACPI table entry.

3. The ACPI-compatible system of claim 1 further comprising:
   device-specific firmware associated with said hardware device, wherein said device-specific firmware comprises said device-specific descriptor.

4. The ACPI-compatible system of claim 1 wherein said device-specific descriptor comprises ACPI Machine Language (AML) code for said hardware device.

5. The ACPI-compatible system of claim 1 further comprising:
   an ACPI-compatible operating system, wherein said operating system is operable to access said ACPI table entry to acquire a description of said hardware device.

6. The ACPI-compatible system of claim 1 further comprising:
   at least one flag associated with said device-specific descriptor, wherein said operation of said ACPI agent in autonomously constructing said ACPI table entry is controlled by said at least one flag.

7. The ACPI-compatible system of claim 2 further comprising:
   at least one flag associated with said device-specific descriptor, wherein said operation of said ACPI agent in autonomously constructing said AML code is controlled by said at least one flag.

8. The ACPI-compatible system of claim 7 wherein said at least one flag comprises a build mask flag that specifies whether AML code for implementing a given functionality is to be constructed by said ACPI agent.

9. A method for an Advanced Configuration and Power Management Interface (ACPI)-compatible system autonomously constructing an ACPI table entry for a hardware device, said method comprising:
   receiving from firmware associated with said hardware device, a device-specific descriptor for said hardware device; and
   an ACPI agent executing on said ACPI-compatible system using said device-specific descriptor to autonomously construct an ACPI table entry for said hardware device.

10. The method of claim 9 further comprising:
    storing said device-specific descriptor to a database accessible by said ACPI agent.

11. The method of claim 9 wherein said device-specific descriptor comprises ACPI Machine Language (AML) code for said hardware device.

12. The method of claim 9 wherein said ACPI agent constructs ACPI Machine Language (AML) code that is included in said ACPI table entry.

13. The method of claim 9 further comprising:
    an ACPI-compatible operating system executing on said ACPI-compatible system accessing said ACPI table entry to acquire a description of said hardware device.

14. The method of claim 9 further comprising:
    said ACPI agent determining the type of information to include in said ACPI table entry based at least in part on at least one flag associated with said device-specific descriptor.

15. The method of claim 12 further comprising:
    said ACPI agent determining the AML code to construct based at least in part on at least one flag associated with said device-specific descriptor.

16. An Advanced Configuration and Power Management Interface (ACPI)-compatible system comprising:
    means for storing a device-specific descriptor for a hardware device; and
    means for autonomously generating ACPI Machine Language (AML) code for said hardware device using said device-specific descriptor.

17. The ACPI-compatible system of claim 16 wherein said means for autonomously generating said AML code is operable to autonomously construct an ACPI table entry for said hardware device.

18. The ACPI-compatible system of claim 17 wherein said ACPI table entry comprises said AML code.

19. The ACPI-compatible system of claim 16 wherein said device-specific descriptor comprises said AML code for said hardware device.

20. Computer-executable code stored to a computer-readable medium, said computer-executable code comprising:
    code for receiving from firmware associated with a hardware device, a device-specific descriptor for said hardware device; and
    code for autonomously constructing an Advanced Configuration and Power Management Interface (ACPI) table entry for said hardware device using the received device-specific descriptor.

* * * * *